United States Patent [19]

Hemsath

[11] Patent Number: 5,078,368
[45] Date of Patent: Jan. 7, 1992

[54] GAS FIRED MELTING FURNACE

[75] Inventor: Klaus H. Hemsath, Toledo, Ohio

[73] Assignee: Indugas, Inc., Toledo, Ohio

[21] Appl. No.: 520,244

[22] Filed: May 7, 1990

[51] Int. Cl.$^5$ .............................................. F27B 9/16
[52] U.S. Cl. .................................. 266/236; 266/900; 266/200; 432/138
[58] Field of Search ............... 266/200, 236, 900, 901; 432/11, 138, 185

[56] References Cited

U.S. PATENT DOCUMENTS

| | | | |
|---|---|---|---|
| 3,782,883 | 1/1974 | Nesbitt et al. | 431/185 |
| 3,819,323 | 6/1974 | Hemsath et al. | 432/138 |
| 3,836,320 | 9/1974 | Hemsath et al. | 432/11 |
| 4,581,063 | 4/1986 | Oyabu et al. | 266/900 |
| 4,664,702 | 5/1987 | Barnes et al. | 266/236 |
| 4,974,817 | 12/1990 | Nakashima | 266/900 |

Primary Examiner—S. Kastler
Attorney, Agent, or Firm—Body, Vickers & Daniels

[57] ABSTRACT

A high temperature gas fired heat transfer system ideally suited for melting metals is disclosed. The system generates a heated, reducing furnace atmosphere which prevents formation of metal oxides when the metal is melted. A unique arrangement is provided to draw a portion of the reducing atmosphere from the furnace and combust the drawn furnace atmosphere with high speeds jets of preheated combustion air which convectively impinge and heat the surface of an object to a super heat temperature. That surface is then moved into the furnace enclosure to indirectly heat by radiation and melt the metal at high throughput rates.

39 Claims, 4 Drawing Sheets

GAS FIRED MELTING FURNACE

This invention relates in a general sense to a gas fired system for high temperature, heat transfer applications and more particularly to a gas fired furnace for melting metals.

The invention is particularly applicable to and will be described with specific reference to a gas fired, ferrous melting furnace for use in mini-steel mills, iron and steel foundries and the like. However, the invention, in concept, is broader in application and can be used wherever economies dictate the use of gas to supply heat in a high temperature, heat transfer application requiring a protective gas atmosphere environment.

INCORPORATION BY REFERENCE

My U.S. Pat. No. 3,782,833 entitled "Flat Flance Burner Having a Low Air to Gas Ratio" and Nos. 3,819,323 dated June 25, 1974 and 3,836,320 dated Sept. 17, 1974 and entitled "Minimum Scale Preheating Furnace and Means Relating Thereto" are hereby incorporated by reference and made a part hereof.

BACKGROUND OF THE INVENTION

I. Commercial Melting Furnaces

A large percentage of iron produced in the United States is melted in cupola-type furnaces. A large percentage of steel is processed from melting steel scrap by means of electric arc furnaces in mini-steel mills.

In a typical cupola, a bed of coke is laid on the bottom of a shaft type furnace and this coke, which is hot, is ignited and combusted by blowing air through it. Alternate layers of scrap, iron and coke are fed to the cupola through the top and the heat produced by combustion of the coke melts the scrap. Molten iron collected at the bottom is generally tapped at the side of the furnace. This method of iron production uses coke i) as a fuel, ii) as a source of carbon which is contained within the iron, and iii) as a mechanism for generating a reducing atmosphere.

In an electric melting furnace, a large electric current is passed through graphite electrodes to generate an arc which melts the scrap charged as a batch into the furnace. The following discussion applies to all electric furnaces whether of the direct-arc type where heat is provided by an arc passing electric current through the charge or where the heat is provided by an arc between electrodes as in an indirect-arc furnace or where the heat is provided by an arc confined for concentrated heating by an electromagnetic field such as in a plasma-arc furnace.

Apart from historical reasons, it is believed the cupola has enjoyed long-term commercial success because it is simple and continuous and, as noted, the coke generates a reducing or protective atmosphere which adds carbon to the metal lowering the melt temperature of the iron. For steel, it is believed that the electric furnace has enjoyed commercial success because extremely high temperatures are produced at the electrode which more than compensate for any oxidation which might occur while the high temperatures produce a very fast throughput heating time for the charge. Nevertheless, both cupola and electric furnaces have drawbacks when they are analyzed against the basic objectives of a metal melting system or furnace. These objectives may be set forth as follow:

a) Basic Process Operation

The presence of oxygen during melting of metal will produce metal oxides. This is, of course, deleterious to the metal making operation. The oxides must either be separated and disposed of or additional heat applied to break the oxide bond.

In short, metal oxidation during melting is expensive and creates a waste which must be handled and disposed of. As already noted, in the electric arc furnace the carbon electrodes are at such a high temperature that they easily react with any oxidant inside the melter as long as the melter vessel is kept tight and oxygen or air is prevented from leaking into the melter. In the cupola, coke is mixed between the scrap and this carbon source scavenges all oxidants above a certain temperature. Technically, it is the ability of the cupola and the electric arc furnace to dissipate the metal oxidation problem which has resulted in the commercial success of the two processes.

In addition to preventing metal oxidation, control of the final melt temperature in a melting furnace is very important for many liquid metal operations. In any casting operation, a certain amount of superheat within the melt must be available to prevent premature freezing in ladling and casting operations. This metal superheat is easily accomplished in an electric arc furnace. It cannot be as readily accomplished in the cupola. Cupolas, therefore, have holding furnaces often attached to them which are used to adjust metal composition. The holding furnaces have to be continually heated before tapping.

A further basic requirement of a melting furnace is that the melter must be capable of operating at high production rates. This can be accomplished in the electric arc furnace by simply building larger arc furnaces. However, large melting rates translate into large utility requirements. Arc furnaces operate on low voltages. Line voltage must be transformed to lower values and the majority of arc furnaces still operate on direct current. The auxiliary electric equipment is large and expensive and contributes to a major reduction in energy efficiency. The equipment also consumes a significant amount of cooling water. In cupola operations, the significant expenses related to off gas cleaning and the essentially continuous operation of the cupola basically prevent upgrading the throughput capacity.

b) Scrap Grade and Melter Operation

Scrap is traded in several grades which have different utility in melting operations. Major scrap properties relate to typical scrap dimensions, cleanliness, composition and physical attributes like springiness and stampings. A good melter must be capable of handling a wide variety of scrap. Buying less expensive scrap grades can reduce product cost provided melting rate, product composition and melter emissions are not adversely affected. Neither the electric arc melter nor the cupola can melt one of the best suited scrap types which is turnings and borings. In addition to the scrap price, the physical attributes of various scrap, such as permeability of the scrap for the cupola and cleanliness of the scrap for the electric melter, have a major impact on melter performance and operation. The cleanliness of the scrap can be of a major concern to the safe operation of the electric arc furnace. It is known apart from any health problems or polluting problems which may relate to oily type scrap, that water trapped within scrap bundles of waste can cause the bundles to literally explode when the scrap bundles are heated at high rates by the electrode and the scrap bundles can be and have been propelled as projectiles through the electric arc furnace.

c) Metal Composition Adjustment

The melting furnace must provide for adjustment to the chemical composition of various heats produced in the mill or foundry. The electric arc furnace is ideally suited for this since it is a batch furnace. The cupola, on the other hand, must use or add an electrically heated holding furnace to permit composition adjustment and superheat control.

d) Control of Emissions

The emissions from melters can be classified into three groups which basically reflect three different groupings of contaminants in the scrap. The "as bought" scrap is dirty and contains significant amounts of oils, paints, other combustibles and water. During melting of the scrap other emissions can be produced by chemical reactions occurring in the furnace atmosphere. In the electric arc furnace, the local temperatures are so high as to produce metal vapors, especially for some lower melting heavy metals. These vapors are emitted together with iron oxides and are in the form of aerosols which makes their collection difficult. The electric arc furnace also emits large amounts of air polutants in the form of unburned hydrocarbons from the heating of dirty scrap and carbon monoxide from the oxidation of the carbon electrodes which occur during melting. Thus, an afterburner and a bag house are needed to clean the exhaust gases. Even the addition of a bag house and an afterburner does not entirely solve the emission problems associated with the electric arc furnace because the electric arc furnace is a batch furnace and it is difficult to exhaust all the unburned hydrocarbons and carbon monoxides from the furnace to the incinerator.

The operation of the cupola is somewhat different due to the different nature of the melting process used in the cupola. However, the same type of exhaust gas cleaning equipment, i.e. an afterburner and a bag house, must be added to the cupola.

e) Maintenance

Both the electric arc furnace and the cupola have continuing maintenance problems. The frequency of the maintenance for both melters has been reduced due to the introduction of high temperature and wear resistant materials. However, inherent in the operation of the electric furnace is the erratic behavior of the electric arc which creates very high local heat fluxes and contributes to the early failures of refractories. To prevent such failures, modern electric arc furnaces use water cooled metal surfaces to avoid related material deterioration. This obviously results in a trade-off which is increased energy consumption to compensate for the metal cooling which not only leads to higher operating costs, but also to a larger and higher rated electric power supply system.

f) Costs—Equipment and Operating

The cupola was at one time an inexpensive piece of equipment. However, the addition of the particulate cleaning equipment and the afterburner has increased the cost of the cupola dramatically. The electric arc furnace, as already indicated, carries the additional burden of a very large, complex and expensive electrical power supply system which is in fact higher than the actual cost of the melter itself. Electrical energy costs are reflected not only in the total kilowatt usage but also in the fact that peak line power with increased energy costs must be used at various times. Such factors result in significant energy costs which will be discussed in further detail in the Detailed Description of the specifications which follows.

II. GAS FIRED MELTERS

Despite inherent advantages which arise in any system which uses natural gas as a source of fuel, the use of a commercially acceptable natural gas fired burner system to melt metals has not been developed. In the basic steel making processes, liquid fuel fired burners have been used in the open hearth furnace.

The open hearth process employed a regenerative heat transfer system which reversed the direction of firing of the burners in the furnace to heat a set of brick checkers to recover heat from the expended combustion gases through which the incoming combustion air that was fed to the burners was preheated. The down side, which was one of the key factors leading to the demise of the open hearth furnace, was the limited productivity or throughput of the process in both the charging time and the extensive melting and refining periods which required approximately 6-8 hours for melting and refining alone. Using oxygen lances the melting and refining time was reduced but it was still too extensive. Also, the oxygen lances in turn created fumes and particulates which required the gas cleaning equipment now used in the electric arc and cupola furnace applications discussed above.

Apart from the open hearth, it is known to use natural gas in a vertical shaft furnace to directly reduce iron oxide pellets to iron pellets or sponge iron. This process did not melt the pellets. Also, it is known that the gas fired direct reduction process has been used to melt ferrous scrap in a foundry application although commercial utilization of the process has not occurred. In the vertical shaft process, gas fired burners supply heat to a vertically dropping moving bed of scrap charge which may be interweaved with carbon (coke) and the reaction controlled by various tuyeres-bustle arrangements staggered along the length of the shaft. The arrangement is not entirely dissimilar from that of a cupola but with the addition of a gas fired bustle-tuyere and there are limits to the process. It is also known to use gas fired preheaters for electric melting furnace application in which the scrap is preheated prior to being charged into the furnace.

Apart from the specific gas fired furnace arrangements discussed above which bear some correlation to a metal melting application, it is known from the iron-carbon diagram that the melting point of steel-iron decreases as the carbon content increases. Thus, any cupola application requires less heat than that required for melting steel because of the coke bed which adds carbon to the iron. However, the carbon addition must then be reduced in the hold furnace, etc.

It is also known in the gas fired burner art that the flame temperature of a burner increases as the air-to-fuel ratio is increased until a maximum adiabatic flame temperature occurs at about or around stoichiometric conditions. Further, it is known that if a burner operates at substoichiometric conditions, the burner will not only emit products of combustion but also unreacted hydrogen or methane in a mixture which is described as fuel rich or reducing. While technically a misnomer, when used in the specifications and the claims herein, the term "products of combustion" means all the products emitted from the burner including those products which in fact have completely combusted as well as those products which in fact have not been totally combusted.

The technical reason why gas fired melting furnaces have not heretofore been developed for metal melting applications resides, despite the economic and non-polluting or clean burning advantages of using gas as the energy source, is the requirement that a reducing atmosphere must be developed within the furnace to prevent metal oxidation coupled with the fact that the flame temperature of a burner operating in a substoichiometric condition to produce the reducing atmosphere cannot generate sufficient heat to melt scrap metal at a throughput fast enough to satisfy mill requirements. This results in spite of the fact that the adiabatic flame temperature of a rich burner is higher than the melting point of the metal. Temperature differential is simply not high enough to provide the desired throughput rates for a gas fired melting furnace. This fact provides one of the underpinnings of this invention.

III. Heat Treat Art

As a matter of general accepted conventional design principles within the furnace art, convection is the heat transfer medium typically employed for low temperature applications, generally about 1000° F. or less. At higher temperatures, such as used in processes where where the surface or the case of the work is altered, heat transfer is primarily conducted through radiation. More particularly, tubes are positioned within the furnace enclosure and the tubes are heated internally by burners firing their products of combustion through the tubes or by electrical heating elements disposed within the tubes. Heat is then radiated from the tube surfaces to the work. With recent developments in technology, temperatures a high as 2350°-2400° F. can be radiated from the tubes to the work for limited peak time periods without thermally fatiguing the tube material. This temperature is insufficient to function in a melting furnace environment.

SUMMARY OF THE INVENTION

Accordingly, it is a principal and general object of the invention to provide a gas fired, indirect heating system which imparts high temperature heat transfer to the work while retaining the inherent advantages of a gas system relating to operating costs and cleanliness of the fuel.

In accordance with this broad object of the invention, a gas fired system for high temperature heat transfer application to work is provided which includes a furnace enclosure containing the work to be heated and a gas fired burner arrangement for substoichiometrically reacting combustible gas with combustion air to produce heated products of combustion which directly fire into the furnace enclosure such that the products of combustion define a reducing furnace atmosphere which is relatively rich in unreacted hydrogen. Within the furnace enclosure is an object having a heat transfer surface and also associated with but separate from the furnace enclosure is a convection chamber. A slot arrangement between the chamber and furnace enclosure provides controlled ingress of the furnace atmosphere into the convection chamber and a mechanism moves the heat transfer surface from the furnace enclosure into the chamber and then out of the chamber into the furnace enclosure. Within the chamber is a jet impingement arrangement which directs streams of combustion air into the chamber for i) causing the furnace atmosphere to be metered into the chamber through the slot mechanism, ii) auto-igniting and reacting the hydrogen in the furnace atmosphere with the combustion air at temperatures substantially above the temperature of the furnace atmosphere and iii) convectively transferring the heat from the reacted furnace atmosphere by impinging the jet streams against the heat transfer surface whereby the heated heat transfer surface will radiate its heat at an elevated temperature to the work so as to indirectly heat the work when the moving mechanism moves the heat transfer surface into the furnace enclosure.

In accordance with a feature of the invention related to a preferred application of the invention, the indirect heating arrangement is used in a gas fired furnace system for melting metal which system includes a furnace enclosure having an inclined hearth, a liquid melt holding vessel in fluid communication with the hearth at one end thereof for receiving melted metal and an arrangement associated with the holding vessel for pouring the liquid metal from the holding vessel. A vestibule associated with the inclined hearth receives the metal to be melted in a manner which seals the metal from the ambient atmosphere and deposits the metal onto the hearth. A gas burner firing within the furnace enclosure generates a partially reacted gas to produce a heated reducing atmosphere which is rich in hydrogen and an indirect heating arrangement is provided for reacting a portion of the reducing atmosphere with oxygen to heat an object within the furnace enclosure to a temperature higher than that of the reducing atmosphere and at least sufficient to melt the metal whereby the object radiates its heat to the metal on the hearth for melting the metal.

In accordance with a more specific feature of the invention the indirect heating arrangement includes the object having an arcuate heat transfer surface, a convective heat transfer chamber, a mechanism for moving the arcuate surface into the convective heat transfer chamber from the furnace enclosure and out of the heat transfer into the furnace enclosure, a slot providing fluid communication between the convective chamber and the furnace enclosure and a jet impingement arrangement for heating the arcuate surface to a supermelt temperature when the surface is in the convective chamber whereby the arcuate surface radiates heat at a supermelt temperature when the arcuate surface is moved from the chamber into the furnace enclosure to achieve fast melting of the metal. In accordance with a more specific aspect of the invention, the object in the furnace enclosure is a cylinder so that the arcuate heat transfer surface is cylindrical. The chamber includes an insulated, longitudinally extending arcuately shaped stationary wall spaced radially outwardly from and surrounding a portion of the cylinder so as to define a convective heat transfer chamber between the stationary wall and the cylindrical surface. The stationary wall has lands at its arcuate ends extending radially inwardly toward the cylinder to define a longitudinally extending slot and the lands are circumferentially spaced relative to the cylinder to encompass a predetermined arcuate segment of the cylindrical surface. The jet impingement arrangement includes a plurality of jets having nozzles extending through the insulated stationary wall and directed to impinge their jet streams against the cylindrical surface at predetermined angles relative to the centerline of the cylinder so that the reacted furnace atmosphere substantially remains within the convective chamber. In accordance with a particularly important aspect of the invention at least the jet streams adjacent the slot in the convective heat transfer chamber create a suction at the edge of the slot adjacent the chamber so that a pressure differential exists through the slot between the furnace atmosphere which is at a more positive pressure and that portion of the chamber adjacent the slot which is at lesser pressure. This insures furnace atmosphere flow within the chamber and prevents oxygen from within the chamber from leaking past the slot into the furnace enclosure. The mechanism for moving the arcuate surface into and out of the convective chamber then simply comprises a drive to rotate the cylinder about its axis thus rotating the arcuate segment into and out of the chamber. Preferably the rotation is continuous to establish steady state heat transfer conditions.

In accordance with yet another specific feature of the invention, the vestibule for the gas fired melter includes a generally vertically extending shaft having a top charge end and a bottom discharge end with the bottom end situated in the furnace closure adjacent to the inclined hearth. A charged or sealing arrangement adjacent the shaft's charge end seals the shaft from ambient atmosphere. A sliding door arrangement in between the shaft's charge and discharge ends seals the top or charging portion of the shaft from the bottom or discharging portion. An open ended charge bucket is within the shaft and a bucket lift arrangement moves the charge bucket between the top and bottom portions of the shaft. A separate bottom plate is provided along with a bottom lift mechanism for moving the bottom plate into and out of contact with the bottom end of the charge bucket. The bottom plate is vertically inclined relative to the charge bucket and to the shaft and generally is about or approximately close to the same angle of the inclined hearth whereat the scrap is deposited. The bucket lift and the bottom plate lift arrangement work in conjunction with one another so that the bottom plate closes the bottom end of the bucket, when filled with scrap, and the bucket and plate move together as a unit to a position adjacent the hearth whereat the bucket is lifted from the bottom plate to the top portion of the shaft while the bottom plate remains adjacent to the hearth. Since the hearth has a greater area than that established by the diameter of the bucket, the scraps freely flow radially outwardly as the bucket is lifted to gently and non-destructively slide by its own weight down the inclined hearth.

In accordance with a still further specific feature of the invention, the inclined hearth has at least first and second contiguous vertically inclined surface with the first inclined surface adjacent the discharge end of the shaft and having a vertical slope steep enough to permit the metal to slide therealong when the bucket is lifted towards the top portion of the shaft. The second surface which is adjacent the melt holding vessel has a shallow vertical slope to permit the second surface to function as a repose surface for the solid metal scrap while at the same time permitting melted metal to flow into the melt holding vessel. The hearth is also heated by radiation from the arcuate heating surface and the hearth in turn radiates and conducts heat to the metal scrap increasing heat input thereto.

In accordance with still yet another aspect of the invention, an exhaust stack is in fluid communication only with the convective heat chamber and within the stack is an arrangement for sensing the gas composition and temperature of the reacted furnace atmosphere and in response thereto controlling the combustion air flow through the nozzles to i) control the indirect heat transfer rate at which the work is heated and ii) control furnace atmosphere pressure as well as the back pressure in the convection chamber.

In accordance with still another specific feature of the invention, improving the efficiency of the entire furnace is that the heat exhausted from the combustion chamber is not only used to preheat the combustion air to the fuel rich burners but is also used to heat the combustion air supplied to the jet nozzles in the combustion chamber while the hot exhaust itself is used to i) purge the charge portion of the vestibule and ii) preheat the scrap in the charge bucket prior to the charge bucket being lowered onto the hearth. In accordance with a particularly important aspect of the invention the shaft functions as an integral preheater which not only preheats the scrap to reduce melt time in the furnace while driving off organics by volatilizing hydrocarbons, but the preheater also reacts and removes from the scrap oxygen compounds which would adversely affect the reducing nature of the furnace atmosphere when melting the scrap and otherwise tend to form metal oxides.

In accordance with still another aspect of the invention, the invention in a general sense includes a gas fired system for indirect, high temperature heat transfer and a process for indirect, high temperature heat transfer and furnace apparatus for effecting high temperature, heat transfer applications.

It is thus a principal object of the invention to provide a system or a furnace or a process which uses a combustible fuel to melt metal.

It is another primary object of the invention to provide a system which uses only combustible gas to effect high temperature, indirect heat transfer applications to work in whatever form the work may take.

It is yet another major object of the invention to provide a gas melter furnace or system or process which achieves a throughput processing time which is commercially acceptable.

It is yet another object of the invention to provide a system, furnace or process which melts metal using less energy and/or less energy costs than conventional systems.

It is still another object of the invention to produce a system, furnace and/or process for melting metals which is less polluting than conventional melting apparatus or processes.

A still further object of the invention is to provide a gas fired system for melting metals which is safer and less suspect of explosion when compared to conventional melters.

Still another more specific object of the invention is to provide a heat recovery system for improving the efficiency of a gas fired melter.

Yet another object of the invention is to provide a hearth construction and a scrap charge arrangement, either of which and the combination thereof produces an improved, long life melting furnace construction.

Still yet another object of the invention is to provide a simple control system for regulating a gas fired melter.

Still another object of the invention is to provide a gas fired melter which generates an inert purge gas at high temperature which is suitable for preheating the metal prior to melting.

Still yet another object of the invention is to provide a gas fired melting furnace which operates on a batch process but does not require a separately heated holding tank for the liquid metal.

These and other objects of the invention will become apparent to those skilled in the art upon a reading and understanding of the drawings and the detailed description of the invention which follows.

BRIEF DESCRIPTION OF THE DRAWINGS

The invention may take form in certain parts and arrangement of parts, a preferred embodiment of which will be described in detail herein and illustrated in the accompanying drawings which form a part hereof and wherein.

DETAILED DESCRIPTION OF THE INVENTION

Figure 1:
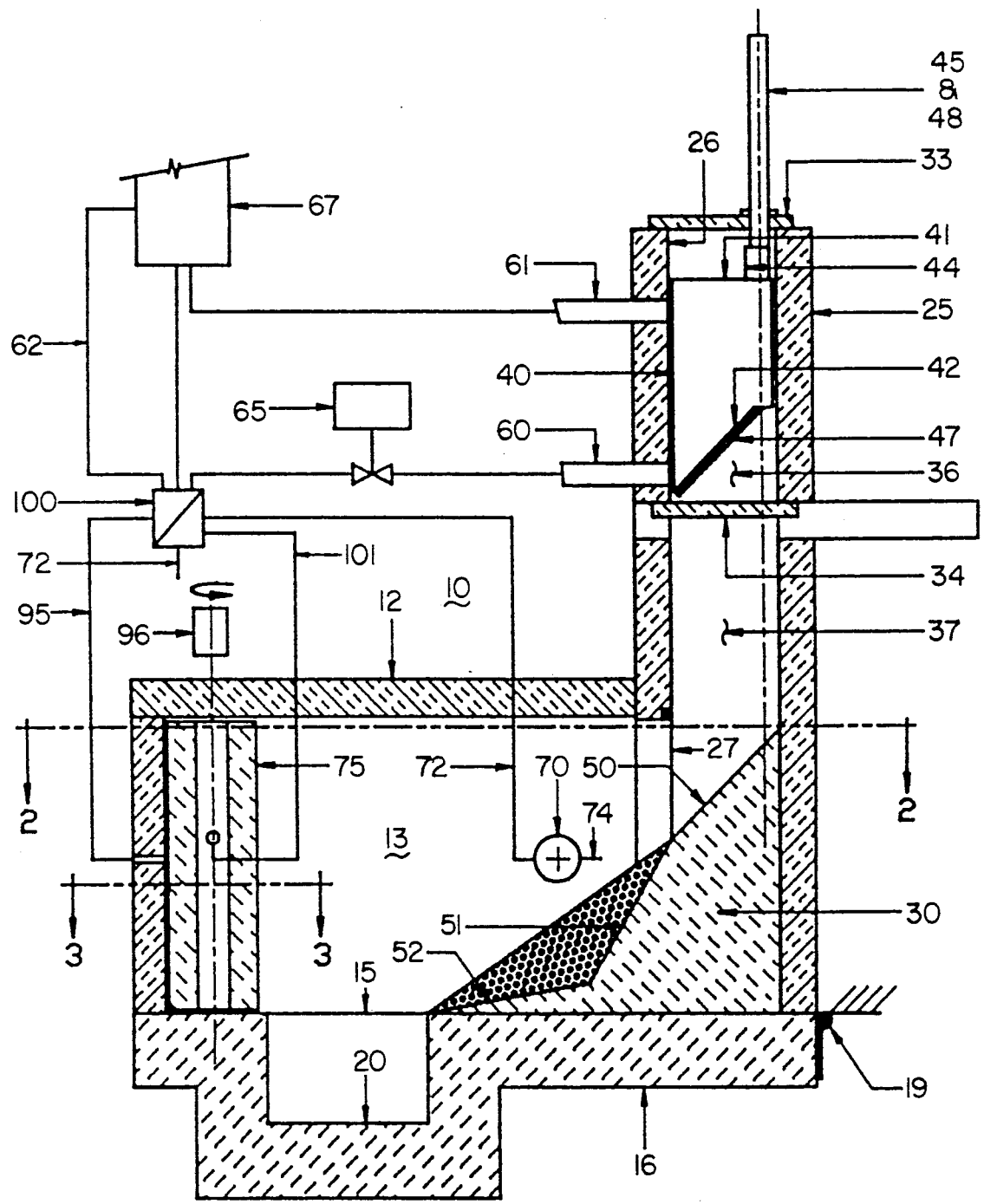
FIG. 1 is a schematic, cross-section elevation view of a gas fired melting furnace of the present invention.

Referring now to the drawings wherein the showings are only for the purpose of illustrating a preferred embodiment of the invention only and not for the purpose of limiting the same, FIG. 1 schematically illustrates a melting furnace 10 of the present invention. Because the invention is concerned with the principles of how furnace 10 operates as a system, no details of the furnace construction per se are illustrated. One skilled in the art understanding the operational concepts of melting furnace 10 would or should be able to construct a furnace using high temperature, conventional ceramic refractory materials, conventional furnace sealing techniques and conventional furnace components available from conventional furnace and control suppliers to construct melting furnace 10.

Melting furnace 10 has high temperature resistant furnace walls 12 which define a sealable furnace enclosure 13. At the bottom end of furnace enclosure 13 is a metal discharge opening 15 which is in communication with a liquid melt holding vessel 16. Holding vessel 16 is diagrammatically shown as being hinged as at 19 to one side of furnace enclosure 13. Holding vessel 16 has a tank 20 in fluid communication with metal discharge opening 15 for receiving liquid metal from furnace enclosure 13 and when a heat is ready to be poured, holding vessel 16 pivots at 19 to pour the liquid metal in tank 20 through a spout (not shown) in a manner not entirely dissimilar to an electric arc furnace. However, furnace 10 is stationary. By providing holding vessel 16 at the bottom of furnace enclosure 13 the heat of furnace enclosure 13, as well as some of the indirect heat radiated to the hearth and metal, is likewise transferred to tank 20 which eliminates then the need for a separate holding furnace which must otherwise be separately heated as in the cupola applications. Side spouts (not shown) can be added to holding vessel 16 to permit addition of alloying elements required for the various heats. The drawback to the arrangement disclosed is that when holding vessel 16 is pivoted to pour liquid metal, heat from furnace enclosure 13 is lost and the atmosphere within furnace enclosure 13 must be purged prior to the next heat. Surprisingly, the pour arrangement shown does not significantly impact the fuel efficiencies. Alternatively and to maintain high throughput of the system, a side spout or spout at the bottom of tank 210 can be provided (not shown) for discharge of the liquid metal without disturbing furnace atmosphere or temperature. Also not shown but used in tank 20 would be a stirrer for circulating the metal in the tank and a sealable openings for adding alloying elements to the tank as well as metal sampling devices, etc.

At one side of melting furnace 10 opposite metal discharge opening 15 and at the top end of melting furnace 10 is a vertically extending scrap charge shaft 25. Shaft 25 may be at least partially viewed as a vestibule conventionally used in the heat treat furnace art in the sense that one of the functions of shaft 25 is to purge the charge or scrap of ambient atmosphere surrounding furnace 10 prior to being deposited in furnace enclosure 13. Shaft 25 has a top charge end 26 and a bottom discharge end 27. Bottom discharge end 27 is situated within furnace enclosure 13 adjacent a vertically inclined hearth 30. Adjacent top end 26 is a charge door 33 for sealing shaft 25 from ambient atmosphere in its sealed position while permitting metal scrap to be charged into shaft 25 in its open position. In between top end 26 and bottom end 27 is a sliding sealable door 34 which divides shaft 25 into a top portion or preheat chamber 36 adjacent charge end 26 and a bottom portion or discharge chamber 37 adjacent discharge end 27 and furnace enclosure 13.

Figure 2:
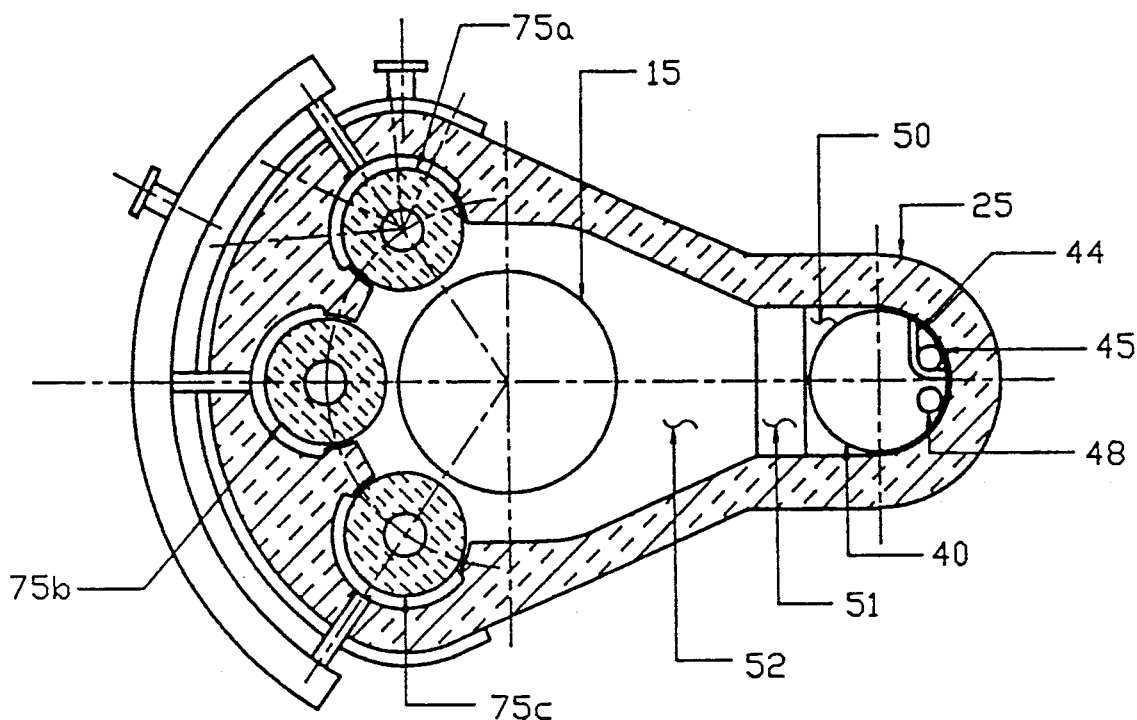
FIG. 2 is a cross-sectional view of the furnace taken along lines 2—2 of FIG. 1.
Figure 5:
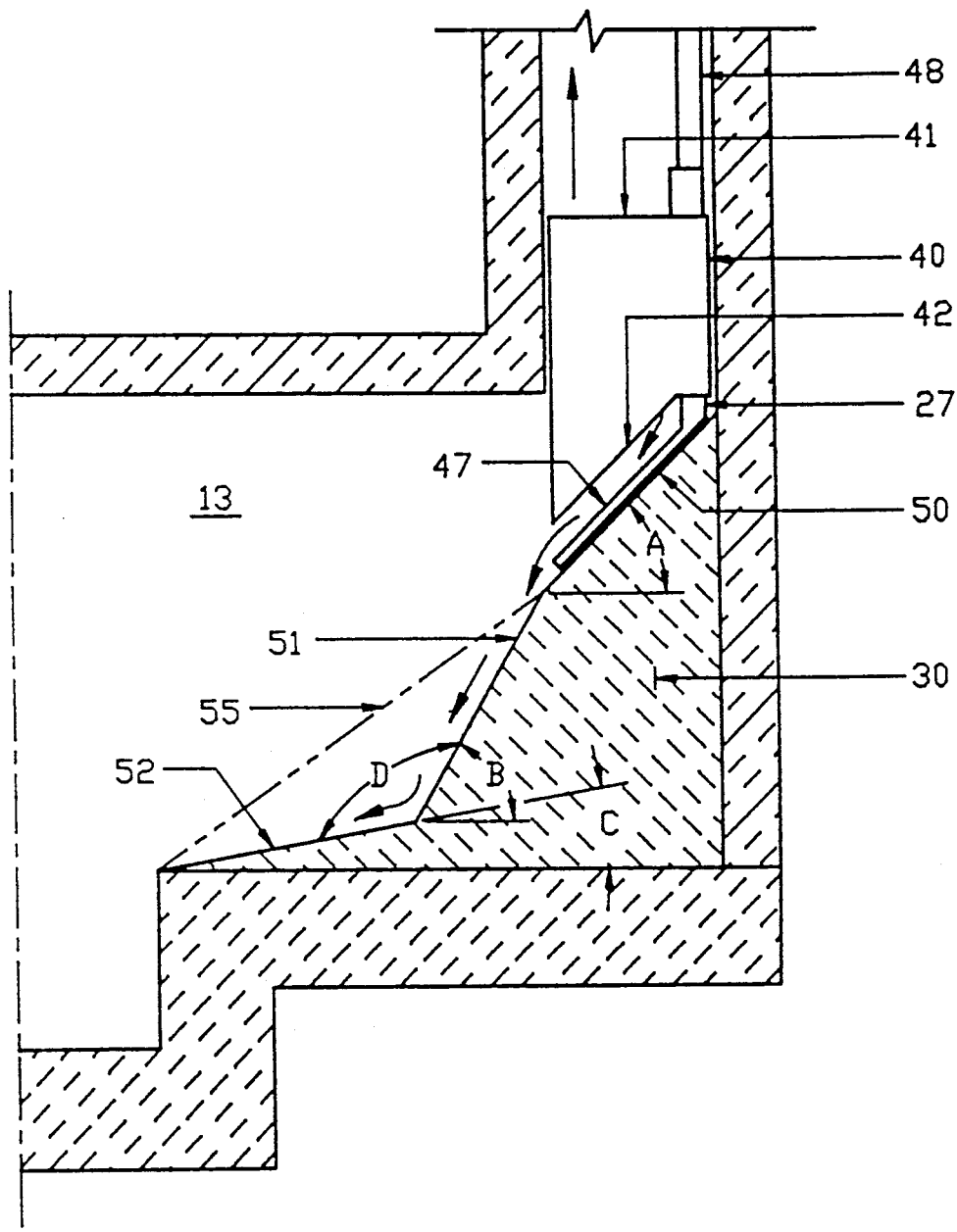
FIG. 5 is an elevation view of only a portion of the furnace shown in FIG. 1 but with the charge bucket of the invention in a discharge position.

Within shaft 25 is a charge bucket 40 which preferably conforms to the tubular shape of shaft 25, i.e. cylindrical. Charge bucket 40 is open at its axial ends. That is, charge bucket 40 has an open top end 41 and an open bottom end 42 and is incapable in and of itself of holding any charge since it is simply an open tubular member. Charge bucket 40 is connected by what is shown as a schematic connection 44 to a bucket lift mechanism or a bucket elevator 45 (FIG. 2). Bucket lift mechanism 45 vertically raises or lowers charge bucket 40 from preheat chamber 36 to discharge chamber 37 and vice versa. As best shown in FIGS. 1 and 5, the cylindrical casing of charge bucket 40 is cut at its bottom end 42 to define a bottom end 42 which is vertically inclined at an angle or slope which is approximately coincident with a portion of the surface of vertically inclined hearth 30. A vertically inclined bottom plate 47 is provided for closing bottom end 42 of charge bucket 40. Bottom plate 47 is angled or vertically angled at the same angle as bottom end 42 of charge bucket 40 and thus bears the same relationship as charge bucket 40 does to vertically inclined hearth 30. Bottom plate 47 is attached to a plate lift mechanism or plate elevator 48 which is shown schematically positioned in front of bucket lift elevator 45 so that only one elevator shows in FIGS. 1 and 5. Elevator mechanism is entirely conventional and two separate lift mechanisms 45, 48 are shown only to illustrate the fact that the movement of charge bucket 40 can be and must necessarily be independent of the movement of bottom plate 47. One elevator lift mechanism can be used with appropriate clutches or engagement mechanisms to permit the independent movement of charge bucket 40 and bottom plate 47.

Shaft 25 works in conjunction with vertically inclined hearth 30. Vertically inclined hearth 30 is at one side of furnace enclosure 13 and extends from the top end of furnace enclosure 13 adjacent shaft bottom discharge end 27 to the bottom end of furnace enclosure 13 adjacent tank 20. Hearth 30 is constructed of conventional high temperature ceramic refractory material and for ease of illustration is shown as a castable one piece hearth. Conventional refractory techniques would dictate that in practice, hearth 30 would be cast, if possible, in several sections. Hearth 30 is shown to include three vertically inclined portions or surfaces, namely a bucket rest support surface 50, a first drop surface 51 and a second repose surface 52. Bucket rest support surface 50 has approximately the same or similar vertically inclined angle or slope as that of the bottom end 42 of charge bucket 40 and bottom plate 47. Bucket rest support surface 50 functions to support bottom plate 47 and serve to provide the discharge angle at which the scrap charge is deposited on hearth 30. The slope, pitch or vertical inclination of bucket rest support surface 50 is designated as angle A in FIG. 5. Contiguous with bucket rest support surface 50 and adjacent to bottom discharge end 27 is first drop surface 51. The slope of first drop surface 51 is relatively steep and the vertically inclined angle of first surface 51 is shown as angle B in FIG. 5. The slope of first drop surface 51 is set at a value which is just great enough to permit the scrap to slide down first drop surface 51. First drop surface 51 is contiguous with and ends at second repose surface 52 which in turn terminates at metal discharge opening 15. The vertical slope of repose surface 52 is less steep than that of the slope of drop surface 51 and its vertically inclined angle is designated as angle C in FIG. 5. The slope of repose surface 52 is such that unmelted metal deposited on repose surface 52 from drop surface 51 does not roll or slide into tank 20 but rests on repose surface 52 while, at the same time, the pitch of repose surface 52 is sufficient to permit liquid metal on repose surface 52 to flow into tank 20. In order to complete the geometric description of hearth 30 and its relationship to shaft 25, the included angle formed between repose surface 52 and drop surface 51, shown as angle D in FIG. 5, must be greater than 90°. Further, if bucket rest support surface 50 were extended as an imaginary line, shown as 55 in FIG. 5, the imaginary line 55 would ideally intersect with discharge opening 15 and form the third leg of a triangle with first drop surface 51 and second repose surface 52. Thus, imaginary line 55 establishes a triangular envelope which determines the volumetric capacity of furnace 10 while maintaining the desired positioning of the charge on a repose surface. For purposes of preferred angular disclosure, angle A would equal 45°, angle B would approximate 60°, angle C would approximate 15° and angle D would thus equal approximately 110°.

As thus far described, with sliding door 34 sealed and charge bucket 40 adjacent top charge end 26 of shaft 25 with bottom plate 47 sealing bottom end 42 of bucket 40, charge door 33 is open and scrap is charged into bucket 40. Charge door 33 then seals top charge end 26 so that preheat chamber 36 is sealed and not in fluid communication with discharge chamber 37. At this time, preheat chamber 36 is purged with a non-inert slightly reducing atmosphere. It is a specific feature of the invention that the exhaust gas from melting furnace 10 is pushed through a preheat chamber inlet 60 and exhausted through preheat chamber outlet 61 to effect not only a purge or preheat chamber 36, but also a preheat of the charge in charge bucket 40. A gas sampler and a thermocouple (not shown) within preheat chamber 36 is outputted to a controller 65 which in turn regulates the flow and temperature of the exhaust gas entering inlet 61 as well as controlling lift mechanisms 45, 48 and the positioning of doors 33, 34. If necessary, controller 65 could also regulate the introduction of either an inert or a reducing gas into preheat chamber 36 to provide any makeup gas elements needed when sliding door 34 is opened to provide fluid communication between preheat chamber 36 and discharge chamber 37. However, it is specifically contemplated that addition of makeup gas to the preheat chamber's atmosphere is not needed when the invention is used to melt steel or iron scrap. A source of purge oxygen (not shown) is also provided and regulated by controller 65 for use at the completion of the cycle prior to opening top charge door 33 when another load of scrap is to be charged into bucket 40. The gas sampler and thermocouple within preheat chamber 36 will result in a very careful control of burndown or volatilization of hydrocarbons, water vapor, etc., which in turn will be ported to an afterburner heated in good part by the exhaust gas recovered from melting furnace 10 prior to being exhausted to a stack 67.

When the charge in charge bucket 40 has been sufficiently preheated so that the charge reaches a preheat temperature whereat the hydrocarbons and the water vapor and other material that could product oxygen and the like have been for the most part driven off, sealing door 34 is opened and bucket lift mechanism 45 and plate lift mechanism 48 are actuated to move charge bucket 40 and bottom plate 47 together as a unit into discharge chamber 37 and specifically to a position whereat, as shown in FIG. 5, bottom plate 47 is resting on support surface 50 with bottom end 42 of bucket 40 initially against bottom plate 50. The preheat temperature for steel scrap would be about 1600° F. which would be less than that temperature whereat iron oxides would form but high enough to drive off or thermally clean the scrap from objectionable material and which, importantly, would not result because of the preheat temperature, in aerosol type particulates. At this point, the atmosphere within preheat chamber 36 will be in fluid communication with furnace enclosure 13 vis-a-vis discharge chamber 37. However, because the scrap has been preheated to remove from the scrap those items which might have a deleterious effect on the furnace atmosphere including, for the most part, oxygen containing compounds no adverse effect on the furnace atmosphere will occur. Because of the thermal cleansing characteristics of the preheater, the invention can handle low grade scrap and specifically turnings and borings which cannot be readily processed in the commercial melting furnaces discussed above.

With bottom plate 47 and charge bucket 40 resting on support surface 50 and containing a charge of preheated and thermally cleaned scrap, bucket lift mechanism 45 is actuated by controller 65 to gradually lift charge basket 40 away from bottom plate 47 which remains stationary. Because support surface 50 has a larger dimension or greater area than the diameter or cross-sectional area of charge bucket 40, there is no longer any restraint on radial movement of the scrap and the scrap will gently roll or tumble radially outwardly from charge bucket 40 onto support surface 50 and also from bottom plate 47 and thence by gravity onto vertically inclined drop surface 51 until coming to rest at repose surface 52. Since the lift of charge basket 40 is regulated, the scrap charge within bucket 40 is gradually and gently deposited onto inclined hearth 30 instead of being dropped thereon with the result that the hearth life is significantly increased.

Referring now to FIGS. 1 and 2, the heating system of the invention will be disclosed. Extending within furnace enclosure 13 is a gas fired burner 70. Gas fired burner 70 is oriented to directly fire its output or its products of combustion directly into furnace enclosure 13. Thus, the products of combustion from burner 70 produce furnace atmosphere within furnace enclosure 13. The furnace atmosphere within the furnace enclosure is at a slight positive pressure of anywhere from about 1 to 3 inches of water. The positive pressure is preferably established by the burner firing into furnace enclosure 13. Other known means can be used to establish furnace pressure. Burner 70 uses combustion air preheated in line 72 which is mixed with a combustible gas preferably methane and preferably methane supplied in the form of natural gas furnished by gas distribution companies which is piped to burner 70 in line 74. The air to gas ratio supplied burner 70 is regulated at a level which would not produce a stoichiometric reaction or combustion but which does produce substoichiometric reaction or combustion. Preferably an air to gas ratio of 45:1 to 6:1 will be burned in burner 70. The substoichiometric combustion will produce a reducing or a rich atmosphere in that the products of combustion from the burner exhausted into furnace enclosure 13 will have unreacted hydrogen in the form of uncombusted methane. Preferably, the unreacted hydrogen will comprise by volume at least 10% of the furnace atmosphere and preferably within the range of 10-25% of the furnace atmosphere.

A typical furnace atmosphere and composition produced by burner 70 would be the following:
 hydrogen: 16.5%
 carbon monoxide: 15.0%
 water vapor: 10.5%
 carbon dioxide: 2.8%
 nitrogen: 55.2%

Burner 70 is not per se a part of this invention. However, the furnace atmosphere the burner produces is an integral part of the invention. Substoichiometric burners and specifically burners capable of reacting combustion air with natural gas at the ratio specified to produce the furnace atmosphere defined are available from traditional burner manufacturers such as Maxon, Eclipse, North American, etc. While the burner companies mentioned do not specifically offer a burner model which is designed to produce the aforementioned reducing atmosphere, the burner companies do offer designs which can be modified in their air-fuel regulators to meter the desired inputted ratios of air to fuel into the burner body and which have a burner body configuration which would support the combustion of a substoichiometric mixture to produce the reducing atmosphere. Reference should be had to my prior U.S. Pat. Nos. 3,782,883, 3,836,320 and 3,819,323 which show an arrangement for producing and controlling a reducing atmosphere by substoichiometric firing of burners in a reheat furnace. A similar arrangement can be used in the present invention to develop and control the reducing furnace atmosphere employed in the present invention. A number of other schemes can be used to generate a reducing furnace atmosphere. For example, a conventional stoichiometrically fired burner can be employed with makeup gas elements (methane) added to the burner's products of combustion to produce the desired reducing atmosphere not completely unlike that used in atmosphere carburizing furnaces.

Also, as noted above in the Background of the specifications, the flame temperature of the burner operating at substoichiometric conditions to produce the reducing atmosphere will be less than the adiabatic flame temperature produced at stoichiometric conditions. At the ratio of 4 to 6 parts air to 1 part gas, the flame temperature produced would be higher than the melting temperature of steel, but the enthalpy of the atmosphere within furnace enclosure produced *only* by the substoichiometric gas burner would be too small, and would not be sufficient in and of itself to melt the charge or to melt the charge at a sufficient throughput or rate to commercially justify the melter.

Accordingly, the invention is directed to an arrangement which first produces a reducing atmosphere to prevent oxidation of the metal during melting thereof even though the heat produced by the reducing atmosphere is insufficient to commercially melt the metal. This is done in the present invention by indirectly heating the metal through radiation from an object which in turn is heated to a much higher temperature than that which is required to melt the metal and at a high enough temperature differential such that the throughput of melting furnace 10 is commercially acceptable.

Figure 3:
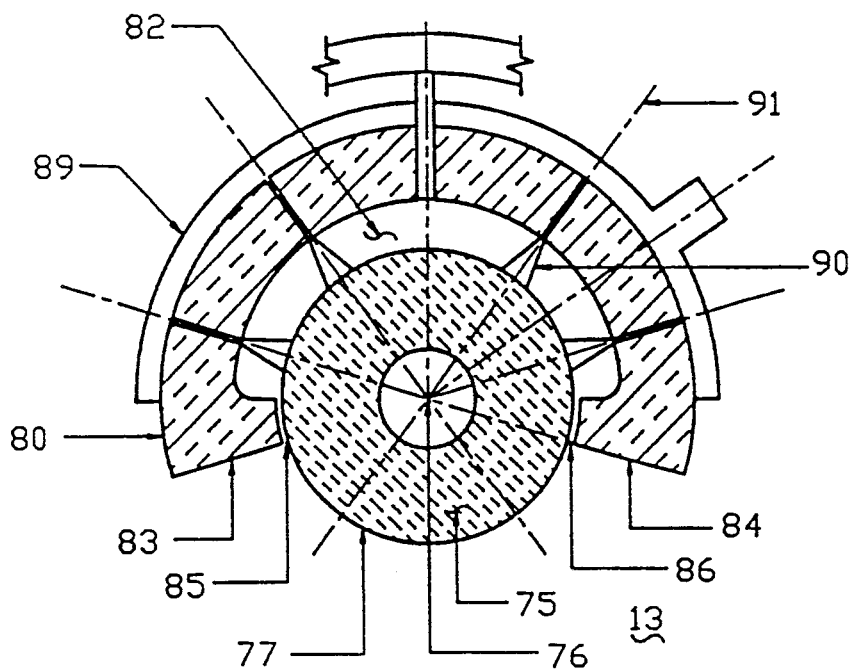
FIG. 3 is a schematic, cross-sectional view of a portion of the furnace taken along lines 3—3 of FIG. 1 and illustrating the combustion chamber arrangement used in the invention.

Referring now to FIGS. 1 and 2, in the preferred embodiment of the invention, the object which is used to indirectly heat the work is a cylinder 75 having a surface 77 formed of high temperature resistant ceramic refractory material. Melting furnace 10 is so constructed so that at any given position or time period an arcuate portion of cylindrical surface 77 is within furnace enclosure 13 while another arcuate portion of the surface of cylinder 75 is outside of and separate from furnace enclosure 13. More specifically and as best shown in FIG. 3, cylinder 75 is journaled to rotate about its cross-sectional center point 76 and on one side of cylinder 76 is furnace enclosure 13. On the opposite side of cylinder 75 is an insulated, arcuately shaped stationary wall which extends longitudinally the length of cylinder 75. Wall 80 is spaced radially outwardly from the cylindrical surface 77 of cylinder 75 to define a convective heat transfer chamber 82 which is the space between stationary wall 80 and arcuate heat transfer surface 77 of cylinder 75 which is within and forms part of convective chamber 82. Stationary wall 80 circumferentially extends about cylinder 75 to span a predetermined arcuate segment of cylindrical surface 77 with stationary wall 80 ending at arcuate ends 83, 84 which extend radially inwardly towards cylindrical heat transfer surface 77 terminating in lands 85, 86 which are positioned very close to cylindrical heat transfer surface 77. The distance between cylindrical surface 77 and land 84 at one end of stationary wall 80 and cylindrical surface 77 and land 85 at the other end of stationary wall 80 is very close and defines a slot at each end of stationary wall 80 which extends the longitudinal length of cylinder 75. Fluid communication between convective heat transfer chamber 82 and furnace enclosure 13 exists only vis-a-vis the slots between lands 84, 85 and cylindrical heat transfer surface 77. As will be shortly explained, the slots act as one way orifices permitting a metered flow of furnace atmosphere into heat transfer chamber 82.

A combustion air distribution manifold 89 surrounds the outside of stationary wall 80 and is in communication with a plurality of jet nozzles 90 extending through stationary wall 80 and into convective heat transfer chamber 82. Preheated combustion air is pumped at high pressure into manifold 89 and through jet nozzles 90 which direct free standing jet streams of combustion air against that segment of cylindrical heat transfer surface 77 which is contained within heat transfer chamber 82. The air streams through jet nozzles 90 are free-standing jets and while their velocity can be regulated, they have a velocity of at least 10,000 fpm. At this velocity, the jet nozzles 90 closest lands 84, 85 are so angled relative to cylindrical heat transfer surface 77 so as to create a suction pressure differential at the slots which cause furnace atmosphere 13 to be drawn or sucked into heat transfer chamber 82. Further, the radial spacing, the circumferential width and the shape of lands 85, 86 is such as to establish an orifice between lands 85, 86 and cylindrical heat transfer surface 77 which is sufficient to meter the flow through the slots such that the flow rate of furnace atmosphere through the slots can be controlled by varying the pressure of combustion air in jet nozzles 90. At the same time, the jet streams are entraining a portion of the furnace atmosphere pulled through the slots and since this furnace atmosphere is rich in unreacted hydrogen and at an elevated temperature, auto-ignition is occurring even prior to impingement against cylindrical heat transfer surface 77. Once the jet stream impinges cylindrical heat transfer surface 77, turbulence occurs and complete combustion results as the jet stream flow from one nozzle, spreads out along heat transfer cylindrical surface 77 and encounters a similar flow from an adjacent jet nozzle 90. The turbulence from impingement with the work and with adjacent streams produces high rates of convective heat transfer in the range of 25 Btu/hrft$^2$. In addition the jet streams impingement produces a thin layer of reacted furnace atmosphere, akin to a laminary boundary flow layer, which swipes or hugs cylinder surface 77 within combustion chamber 82. The layer is impervious to combustion air and if flow occurs out of combustion chamber 82 and into furnace enclosure 13 it will be vis-a-vis the boundary layer attached to cylindrical surface 77. Importantly, this layer has reacted furnace atmosphere without oxygen and is inert. Thus no adverse effects occur to the reducing atmosphere in furnace enclosure 13 by any "leakage" from convection chamber 82.

A duct 95 (FIG. 1) controls the flow of reacted furnace atmosphere or completely combusted furnace atmosphere from heat transfer chamber 82 and this in turn establishes the pressure within heat transfer chamber 82 and accordingly, because of the flow of furnace atmosphere through the slot, the pressure of the furnace atmosphere within furnace enclosure 13. When that arcuate segment of cylindrical heat transfer furnace 77 which forms a part of and which is within heat transfer chamber 82 is heated to an elevated temperature, a drive 96 is actuated by controller 65 to rotate the heated segment away from stationary wall 80 and into furnace enclosure 13 and at the same time rotate that arcuate segment of cylindrical surface 77 which was previously within furnace enclosure 13 into heat transfer chamber 82. The heated cylindrical segment of cylindrical heat transfer surface 77 thus radiates its heat to hearth 30 and to the metal charge resting on hearth 30. As the heat from the heated segment is given up to the work, drive 96 is actuated. The cooled segment is rotated into heat transfer chamber 82 while the previously cooled segment of cylindrical heat transfer surface 77 has now been heated and is rotated back into furnace enclosure 13. Rotation does not have to be intermittent and it is contemplated that the rotational speed is preferably uninterrupted or continuous and correlated to the heat transfer loss to establish steady state radiation heat transfer to the work. It should be noted that inherent in the arrangement is the fact that the radiated heat will also heat the hearth as well as the metal on the hearth and the hearth in turn will also heat the melt by conduction. Further, some radiation will occur with tank 20 since the tank can "see" cylinders 75.

The output of melting furnace 10 is thus determined by the number of cylinders 75 and chambers 82 used in furnace 10 (as well as size, etc.). Preferably for heat balance considerations at least two cylinders 75 and chambers 82 are used. In the preferred embodiment three cylinders 75a, 75b and 75c are shown in FIG. 2. Calculations based on combustion air in the jet nozzles preheated to a temperature of 1400° F. to establish the heat transfer rates cited at the jet nozzle flow rates indicated, establish that reacted furnace atmosphere temperatures in excess of 4000° F. can be impinged against cylindrical heat transfer surface 77 which in turn can be heated to temperatures of as high as 3200° F. which will generate supermelt temperatures in the melted metal at commercially accepted throughput times, i.e. batch times of 3 hrs for melting furnaces 10 having a holding capacity of 15 to 500 tons.

Figure 4:
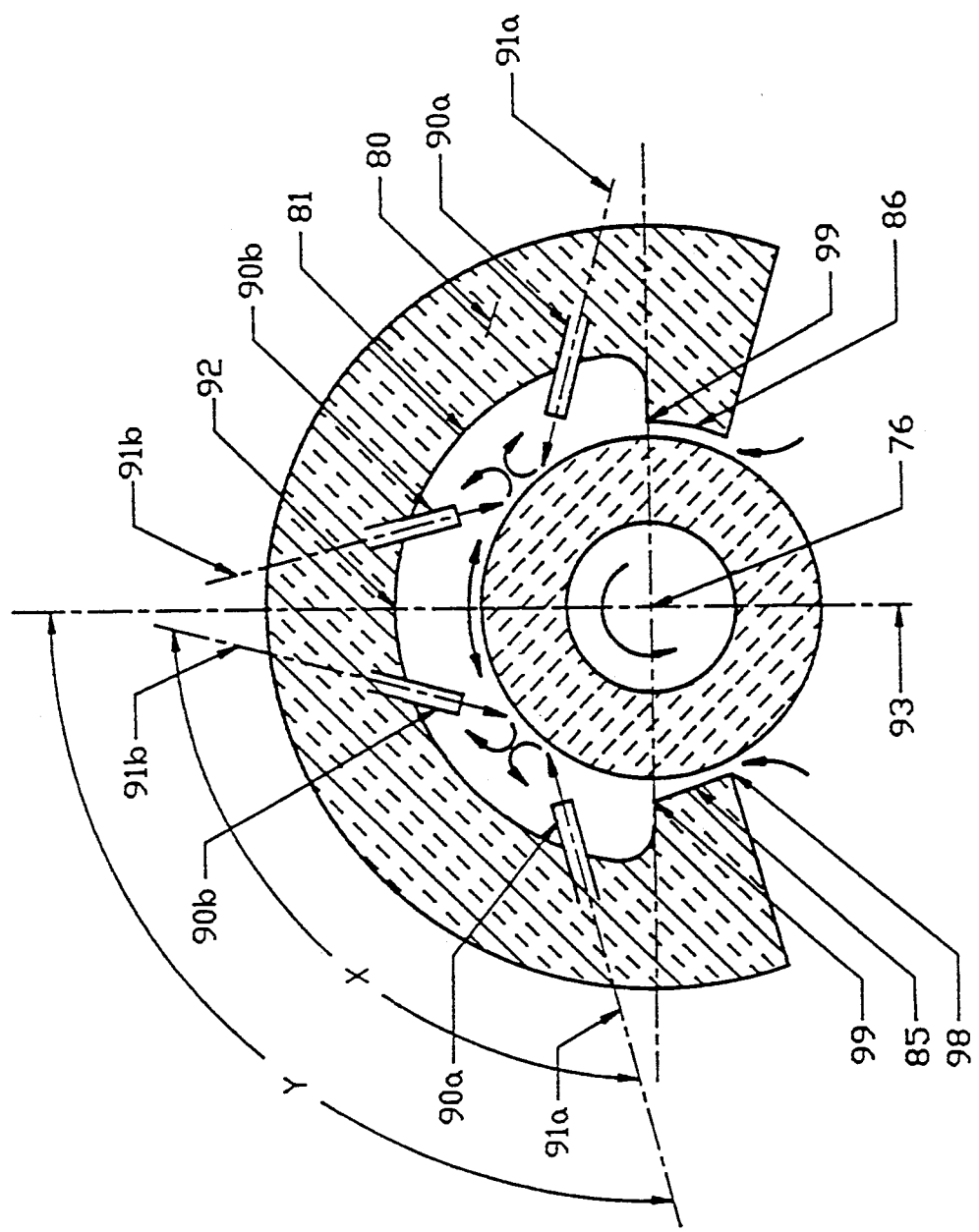
FIG. 4 is a view similar to FIG. 3 illustrating an alternative nozzle configuration.

Referring now to FIGS. 3 and 4, FIG. 3 illustrates an arrangement where the centerline 91 of jet nozzles 90 intersects the center 76 of cylinder 75. The jet streams adjacent the slots would be sufficient to establish an under pressure or pressure differential through the slots in the sense that the pressure of the furnace atmosphere in enclosure 13 would be greater than the pressure in the chamber at that point in the chamber adjacent the slot while the pressure in the remainder of chamber 82, because of the turbulent flow of the jets, would be higher than the pressure of the furnace atmosphere within furnace enclosure 13. In FIG. 4, a preferred nozzle orientation is shown in that the centerline of jet nozzles 90, at least jet nozzles 90 adjacent the slot, would not intersect the center 76 of cylinder 75. More particularly, stationary wall 80 has an inner cylindrical wall surface 81 which is concentric with cylinder 75 but spaced radially outwardly therefrom a predetermined distance. Thus, the circumferential midpoint 92 of cylindrical wall surface 81 lies on and is coincident with one of the axes 93 of cylinder 75 and bisects heat transfer chamber 82 into two equal portions. In the FIG. 4 embodiment, jet nozzles 90a which are closest to the slots, are orientated relative to jet nozzles 90b which are closest to circumferential midpoint 92 such that the included angle "X" between jet nozzle centerlines 91a and 91b must be greater than 90° and the included angle shown as "Y" in FIG. 4, between the centerline 91a of jet nozzles 90a closest to the slots with cylindrical axis 93, must also be greater than 90°. This geometric arrangement enhances the flow of furnace atmosphere through the slots in that the aspiration of the atmosphere attributed to jet nozzles 90a are enhanced by the orientation of nozzles 90a. Additionally, the turbulence created by impinging jets between 90a and 90b and accordingly the heat transfer convected to cylinder 75 is improved. Overall heat transfer for the arrangement shown in FIG. 4 can be improved by adding additional jet nozzles between 90a and 90b and even additional nozzles can be added near midpoint 92 between adjacent nozzles 90b.

As is best shown in FIG. 4, each land 85, 86 has a defined width extending between entrance point 98 and exit point 99. Preferably, each land 85, 86 is formed as shown in FIG. 3 as a cylindrical surface concentric with cylinder 75. However, the flow of furnace atmosphere into chamber 82 can be enhanced by radially spacing entrance point 98 close to cylindrical surface 77 so that it is closer to cylindrical surface 77 than the radial distance between cylindrical surface 77 and exit point 99. The land between points 98 and 99 can then be either straight or arcuate.

It will be appreciated by those skilled in the art that the preheated combustion air supplied by jet nozzles 90 to chamber 82 is also metered or regulated through manifold 89 to provide stoichiometric or approximately stoichiometric combustion with the unreacted hydrogen in the furnace atmosphere composition specified above. At the furnace atmosphere temperature, adding oxygen will produce automatic ignition and result in an adiabatic, maximum flame temperature which is effectively transferred, principally by convection, to that arcuate segment of cylindrical surface 77 circumferentially disposed within lands 85, 86. The surface will be heated to supermelt or superheat temperatures of 3200° F. The reacted furnace atmosphere will be substantially inert and will have a composition of no more than approximately 1 to 2% oxygen. In addition, this inert atmosphere as a result of the jet impingement as noted above, will tend to swipe itself or wipe itself about that segment of cylindrical surface 77 between lands 84, 85 to establish almost an imperceptible boundary layer so that if leakage does occur from combustion chamber 82 to furnace enclosure 13 through the slots, the leakage will be inert gas which will not adversely affect the reducing atmosphere characteristic of the furnace atmosphere within furnace enclosure 13. More specifically, jet nozzles 90 establish a boundary layer of gases about cylindrical surface 77 which prevent the oxygen from jets 90 from being transmitted to furnace enclosure 13 which might occur when cylinder 75 is rotated or when the system is throttled back or forward from its steady state condition.

Referring now to FIG. 1, it is contemplated that a gas sampler and a thermocouple within chamber 82 (not shown) whose output is transmitted to controller 65 is all that is required to control the process. However, as a safety precaution, a gas sampler and thermocouple can be provided within furnace enclosure 13 with output transmitted to controller 65 as an override or shut-off feature of the invention. A baffle or valve (not shown) within exhaust duct 95 controls the pressure within chamber 82 and accordingly, the flow of furnace atmosphere through the slots. Additionally, controller 65 regulates the jet air flow to nozzles 90 and the rotational speed through drive 96 of cylinder 75. A very simple control is thus provided. The hot reactive furnace atmosphere is passed through a diverter arrangement grammatically shown as 100 which contains a standard type heat exchanger for preheating combustion air. The preheated combustion air as already indicated is piped through line 72 to furnace burner 70. It is also piped through line 101 to nozzle air manifold 89. The temperature of the preheated air given the high temperature of the reacted furnace atmosphere will be in the neighborhood of about 1400° F. Also within diverter and heat exchanger arrangement 100 is a baffle arrangement which diverts a stream of the reacted furnace atmosphere into preheat chamber 36 through inlet 61 and from thence through outlet 62 to stack 67. That portion of the reacted furnace atmosphere which is not ported through preheat chamber 36 is then exhausted through stack 67. An afterburner (not shown) is installed in stack 67 and is used to insure combustion of the hydrocarbons emitted in outlet 62 of preheat chamber 36 during thermal preheating and cleaning of the scrap charge as discussed above. The preheat chamber outlet 62 is thus piped back to diverter arrangement 100 to be placed in heat transfer contact with the reacted furnace atmosphere exhaust. Depending upon the hydrocarbons, it is possible by using the heat from the reacted furnace atmosphere to incinerate the hydrocarbon within diverter arrangement 100 thus minimizing burner use in the afterburner in stack 67. Also preheated combustion air can be used in the burner in the afterburner.

In the Background, the features of an ideal ferrous melter were discussed and the electric arc furnace and the cupola was analyzed with respect to such features. The gas fired melter of the present invention ideally meets all of the requirements. The final temperature of the melt can ideally be controlled. The melt rate or throughput is high. A wide variety of scrap can be used without major problems. The oxidation of metal is kept to a minimum. Adjustments of metal composition can be made readily. Operation of the melter is either batch or batch continuous. Melter emissions are controlled easily and completely. Operating expenses are low. Maintenance is infrequent and predictable. Melters can be built in a variety of sizes and initial costs are lower than for comparable electric arc melter.

a) Metal Oxidation

In the conventional blast furnace as well as in the cupola, hot metal is produced under conditions which are well understood and which are considered desirable. These melting conditions can best be described as high temperature and reducing atmosphere conditions. As discussed above, the present invention duplicates this concept. The reducing conditions are created by the partial combustion of natural gas with preheated combustion air in burner 70. Such substoichiometric combustion will produce a furnace atmosphere which is reducing to iron and which is still at a temperature well in excess of the melting point of iron. However, the reducing gas produced by burner 70 is not hot enough to also provide the substantial amount of heat which is required for melting, at least for the desired throughput capacity of a commercially acceptable melter. This heat has to be made available by burning the partially precombusted gas mixture to completion, i.e. reacted furnace atmosphere, and transferring the remaining heat to the metal and the melt. This is achieved by jet nozzles 90, heat transfer chamber 82 and cylindrical heat transfer surfaces 77 discussed in detail above. Importantly, the invention controls the superheat temperature imparted to the melt by rotating cylinder 75. If additional capacity is required, this can easily be achieved in the present invention by adding additional cylinders 75 and associated convection heat transfer chambers 82. Capacity of furnace 10 is then increased by simply adding additional cylinders at a much lower cost than that which could be achieved by a similar scaling up of the electric arc furnace.

b) Scrap Grade and Melter Operation

Because of integral shaft 25 the gas melter of the present invention can easily handle various types of scrap and especially turnings and borings. In addition, because the heat up rate of the preheater can be controlled, trapped water does not present the safety problems present in the electric arc furnace or even in the cupola. In addition, because the preheat of the scrap is controlled, aerosol type contaminants are not produced and a bag house is not required. In addition, the preheat scrubs or cleanses the scrap of the oxidants which could otherwise cause the formation of iron oxide within furnace enclosure 13 and thus contributes an important part to maintaining the reducing furnace atmosphere and the prevention of combustion within furnace enclosure 13. Thus, the gas fired furnace disclosed would permit the mill operator to purchase cheaper scrap.

c) Adjustments of Metal Composition

By providing melt holding vessel 16 at the discharge end 15 of hearth 30, not only is the temperature of the heat within vessel 16 controlled but the addition of alloy and elements can be easily accomplished.

d) Control of Emissions

As already noted, the preheat chamber 36 permits the removal of hydrocarbons and permits heating of dirty scrap and removal of low melting metals. In addition, as noted, local metal surface temperatures are not as high as in the electric melter and thus emissions of heavy metal aerosols are prevented.

e) Maintenance

Gas fired melting furnace 10 can take advantage of the major advances which have occurred in materials development during the last decade to produce long life hearth 30 and cylinders 75. Further, due to the fact that the furnace temperature within enclosure 13 can be carefully controlled and because the temperature within melting furnace 10 is lower than the temperature produced at the arc of an electric arc furnace, the refractory life of melting furnace 10 is significantly increased when compared to the refractory life of the electric arc furnace.

f) Operating Costs

Energy costs for the electric furnace are rather high. Typical energy consumption is 500 kWhr/ton or 1.7 MM Btu/ton. Minimum energy costs for melting with electric energy at $0.04/kWhr are $20.-/ton. With an eventual natural gas consumption of about 2.0 MM Btu/ton and a comparable natural gas price of $3.50 the energy cost for melting with natural gas is $7.00. This cost can most likely be further reduced in the case of natural gas while consumption of electrode carbon will add at least another $8.75 to the cost of melting with electricity. It can be expected that the electrode consumption is at least 7 pounds/ton at a cost of about $1.25 per pound of electrode carbon. With an energy cost ratio of 3.3 it is expected that switching from electric energy to natural gas will reduce melting costs from about $28.75/ton to approximately $7.00/ton for a reduction in cost of 75%. However, realistically one should expect initial costs savings to be in the 50% range. This lower cost savings permits a less complex heat recovery technology to be used and will increase operations reliability of the heat recovery system.

A novel melting device is described which significantly lessens variable melting costs by reducing energy costs and by eliminating electrode costs, lowers metal losses, and curtails emissions of pollutants. The reduction of variable melting costs will initially exceed fifty percent (50%) when compared with the state of the art electric arc furnaces and may eventually approach seventy-five percent (75%). The potential for energy savings and cost savings is huge. About 45 million tons per year of steel are presently melted from scrap in the U.S. alone not counting that tonnage which is melted in the iron foundry industry. With maximum savings of $20/ton and full market penetration annual cost savings will approach one (1) billion dollars and new gas sales could be in excess of five hundred million dollars ($500,000,000) per year.

The furnace is based on melting ferrous metals with natural gas. The selected approach of utilizing natural gas is unique and exploits the strong reduction potential of partially oxidized (reformed) natural gas. It also uses several approaches to recover heat from flue gases by increasing flame temperatures and preheating scrap. The overall benefit is the extremely efficient use of gaseous fuel for high temperature melting. It is thermodynamically entirely possible to eventually use less than 600 kWhr (2.0 MM Btu) per ton of liquid metal by applying the proposed, novel approach to melting. With the resulting energy savings and with the complete elimination of electrode usage for melting, costs of melting can be reduced by as much as $20/ton. A single melter with an annual melt capacity of 500,000 tons (about 65 ton/hour) can save in one year as much as $10,000,000.

The melting process is based on advanced heat recovery techniques and especially
a novel indirect heating system,
a novel melter configuration,
an integral scrap preheater.

The indirect heating system is capable of providing indirect heat in the form of thermal radiation from a 3200° F. to a 3000° F. hot surface. The capability to create such high temperatures combined with the batch type operation for the gas fired melter facilitates not only the melting itself but also the superheating of the melt and makes adjustments in melt composition comparatively easy.

The very high heat fluxes which can be created with the proposed heating system permit the fast melting of both scrap and prereduced pellets. In fact, it is potentially possible to perform a limited amount of reduction within the melting chamber, too. The atmosphere inside the melter proper consists of a reducing gas mixture which is prepared from a mixture of natural gas and preheated air. The heat for the preheating of the combustion air is obtained from the hot flue gases which are exhausted by the heating system. This heat is also further used to preheat the cold scrap.

As a result the final temperature of the combustion gases leaving the melter can be reduced to rather low temperatures. This multiple use of the waste heat contained in the flue gases results in an overall thermal efficiency which is rather high and which can eventually approach 50% resulting in a specific fuel consumption of 2 MM Btu/ton.

In the following the melter and its separate subsystems are described and explained in greater detail.

THE MELTER

Batch processing of melts is practiced universally. Batch melting permits the measurement of final melt composition and adjustment of composition. It is also easier to obtain super heating without the use of a fore hearth or a separate holding furnace. The practice of batch processing also conforms ideally with the practice of batch casting. Only very recently has continuous casting made a major inroad into the previously virtually exclusive batch casting practice. Melting is still almost exclusively done in batch melters even after the arrival of continuous casters for strands, billets, and slabs.

The proposed melter consists of the following major modules.
- the heating system,
- the lower melter vessel which acts as a tundish, has a resealable poring spout, and can be lowered for regular inspection and repairs,
- the inclined melting hearth which supports the scrap prior to melting,
- the burners which generate reducing atmosphere gases,
- the charge shaft which also acts as a vestibule,
- the scrap bucket with elevator and discharge mechanism,
- the integral scrap preheater with incinerator,
- the air preheater which acts as a heat recovery device.

Each of these modules is now described with respect to its function and its conceptual design. Of the several modules at least the heating system, the burners, the melting hearth, the charge shaft, and the charging buckets are novel in the proposed form. The arrangement of these modules to form a new melting system represents a totally new approach to melting of ferrous scrap. In a modified form the melter may eventually be used for the melting of non ferrous metals. For such non ferrous application the reducing atmosphere must be replaced with one of different composition.

THE HEATING SYSTEM

The heating system uses a novel combustion and heat transfer arrangement in which a multiplicity of hot air jets are injected into a chamber which is filled with a mixture of hydrogen, carbon monoxide, water vapor, carbon dioxide, and nitrogen. The approximate composition of this gas is:
- hydrogen: 16.5%
- carbon monoxide: 15.0%
- water vapor: 10.5%
- carbon dioxide: 2.8%
- nitrogen: 55.2%

This gas is at the same high temperature as the melter proper and has a significant fuel value (in excess of 100 Btu/cuft). By burning this hot fuel gas with preheated combustion air some rather high combustion temperatures can be achieved. To this end the proper amounts of hot air and flue gases must be mixed. Ignition is spontaneous due to the low auto ignition temperature of hydrogen.

The proper ratio between preheated air and hot fuel gas is approximately between 4.5 to 6 parts of air for each part of fuel gas. The gases readily ignite upon mixing and increase their temperature by more than 2000 F. as a result of combustion. These very hot flame gases are directed towards a rotating cylindrical surface of refractory material. The surface is heated to a very high temperature by the impinging gases. By balancing the heat input from the impinging flame jets with the heat loss from its radiating surface the surface temperature of the rotating surface can be easily controlled and stabilized. The heat fluxes from this hot surface can be very high due to the ability of this surface to emit thermal radiation at a very high surface temperature.

The flow of air and hot gases into the isolated annular chamber formed by the surface of the drum and by a partial refractory enclosure can be closely controlled. By controlling the pressure in the annular chamber and by restricting the flow of hot flue gases from the melter proper into the annular chamber through a relatively small opening in the form of a vertical slot along the surface of the drum, a precise flow of flue gases can be established and controlled. By using very high pressure air (15 to 30 inches water column) the amount of air flow into the annular chamber can be controlled by adjusting this supply pressure. A continuous gas analysis of the combusted exhaust gases for carbon monoxide and oxygen can confirm the operation of the flow control loop.

By dividing the entire rotating surface into two discrete segments it becomes possible to maintain complete separation between reducing atmosphere gases and combusted, oxidizing exhaust gases. One of these segments is the surface exposed to the melter proper, the other segment is in the form of an annular chamber. The chamber is enveloped by one stationary surface and one rotating surface. The chamber width is reduced to a small, slot like opening which can be designed to a range of slot widths. This longitudinal, axysymmetric slot has several functions. It serves as a dynamic seal between the furnace proper and the annular heating chamber. It also creates a slot jet which tends to hug the rotating refractory drum surface. By properly sizing this slot it also performs as an orifice device which permits the metering of flue gases into the annular combustion chamber.

Inside the annular chamber hot air jets are penetrating the annular space and are mixing with the fuel gases on the surface and with the partially reacted combustion products. The air jets are sized to create maximum heat fluxes on the drum surface. Close to the slot opening the jets are slightly angled away from the slot to create suction and prevent back spilling of partially reacted flue gases into the slots. Towards the middle of the chamber the angle of the air jets becomes more oblique.

The combustion products are much hotter than the surface of the rotating drum and the impinging jets create very high local heat transfer coefficients. As a result large convective heat fluxes are created which heat the surface of the drum. The amount of heat transferred by the jets and the amount of heat emitted by the hot surface of the drum to the melter proper are virtually equal when the melter is operating. By properly sizing the respective surfaces and by adjusting its rotating speed it is always possible to release all the convectively transferred heat by thermal radiation to the melter proper.

The rotational speed of the drum is selected such as to prevent excessive swings in surface temperature which are detrimental to the life expectancy of the drum surfaces. The faster the rotational speed of the drum the less heat is absorbed in the heating portion of the cycle and the less thermal radiation for each revolution can be emitted by the rotating surface. As a result the local temperature fluctuations can be kept small and local stresses can be managed.

It is estimated that a temperature differential between drum surface and melter proper of less than 200 F. is sufficient to produce sufficiently high heat fluxes at a typical melter operating temperature of 3000 F. A melter with a melting capacity of 10 t/hr would require a surface area of about 200 square feet to supply the necessary heat for melting. One drum with a diameter of about 10 feet and a height of 20 feet could supply all the required heat. Larger capacity melters can be built by having three or four of such heating drums. Ideally one will design to configure at least two heating drums. Exact meeting of heat input requirements can be accomplished by adjusting the combined surface area of the drums.

With the selected design it is possible to provide net heat inputs in the range between 2 and 50 MM Btu/hr for each drum. Four of these drums will provide as much as 200 MM Btu/hr of net heat. This amount of heat is sufficient o provide a 200 ton/hr melter.

THE MELTING VESSEL

The liquid metal must be collected in a vessel which can typically hold a multiple of the average hourly production rate. This vessel will serve as a storage vessel, a mixing vessel, and a tundish to pour the final melt with the right temperature and the right composition. There are several ways to pour. One can provide a pour spout which is opened whenever pouring is to begin but is closed during melting and melt adjustment; this procedure is typically used in blast furnaces. Or one can tilt the entire holding vessel and pour from the lip; this procedure is widely used for electric arc furnaces.

Pouring through a spout is vastly preferable for the gas fired melter. This approach avoids the tilting of the hearth. Tilting of the superstructure as done on many arc furnaces is not recommended for the gas fired melter due to the large weight and the more complex configuration of the melter proper.

THE MELTING HEARTH

In the typical arc melter the liquid metal drips from the top of the scrap pile to the bottom of the vessel. On the way down the metal may freeze several times before it hits the liquid heel in the bottom of the vessel. The liquid melt, accordingly, barely has any superheat as long as a still sizeable amount of scrap has yet to be melted.

In the gas fired melter the melting process is slightly different. The melting metal first drips onto a refractory hearth which is inclined toward the melt vessel and which supports the scrap but which also is heated at all times by radiation from the rotating heating drums. As a result, the melt is further heated when it flows down the inclined hearth and into the holding vessel. The liquid metal inside the holding vessel is, therefore, already superheated and will furthermore heat up slowly because of the heat received from the heating drums. After complete melting of all charged scrap, the liquid is already partially superheated and can immediately be processed further. The liquid which is flowing at an accelerating rate into the melt reservoir also serves as a mixing and stirring medium.

The melt is, therefore, much better prepared for final composition adjustment prior to pouring than in the electric arc furnace.

THE GENERATION OF A REDUCING ATMOSPHERE

Iron and steel will oxidize when exposed to oxidants like air and water vapor. Expensive metal is converted into much less valuable iron oxide and the iron oxide must be managed within the melter where it interferes with the melting operations. Oxidation and scale formation can be avoided by making the gas atmosphere reducing. Such a reducing atmosphere can be created by several means. Preferably conventional type burners can be modified and operated with preheated air and partial oxygen enrichment to produce a reducing atmosphere which has a high flame temperature. The gases which are produced this way can be used to partially heat the scrap by convection and give up their excess enthalpy. After partial cooling the gases are drawn into the heating drums where they are burned with the reminder of the stoichiometrically needed air.

This approach generates a rather vigorous gas flow inside the melter and assures that oxidation losses are kept to a minimum. The high hydrogen content of the reducing atmosphere facilitates ignition of the jets inside the heating drum chambers and assures clean and complete combustion. The fuel input into these burners is quite large. Even a small melter with a melting capacity of 5 ton/hour will require between 10 and 20 MM Btu/hr. Burners with inputs between 10 and 50 MM Btu/hr nominal natural gas input will be required.

THE CHARGING DEVICE

The decision to maintain the process atmosphere reducing has many advantages but also creates some special requirements. To preserve the atmosphere and to prevent instantaneous combustion of the atmosphere with air it is necessary to keep the atmosphere separated from any contact with air. Therefore, a charging vestibule is needed which permits the exchange of the oxidizing air atmosphere against a reducing fuel gas atmosphere.

To this end the scrap and the entrapped air are isolated in a chamber prior to admittance into the melter. This isolation chamber is purged with flue products until all oxygen is flushed out from the chamber. If one uses hot flue products form the heater exhaust one also begins to preheat the scrap. Scrap preheating has a very beneficial effect on the performance of a melter. A significantly lower amount of heat must be transferred by radiation from the heating drums. Also, the heat provided to the scrap from the flue products reduces specific energy consumption considerably. The vestibule can, therefore, act as a scrap preheater.

THE SCRAP PREHEATER

When preheating scrap several processes can take place at the same time. One recovers waste heat by a very cheap and effective method which can be classified as regenerative heat recovery. One increases melter capacity because the heat requirement from the melting chamber is reduced. This reduction in heat requirement can translate in either a reduction of heat input or in an increase in productivity. One can even pre-clean oily and painted scrap and one can especially assure that any scrap is being dried completely before it is charged into the melting chamber.

By providing an external recirculation loop it is possible to implement all these different processes as part of the charging procedure.

THE SCRAP BUCKET WITH ELEVATOR

The scrap must be charged into the vestibule, the atmosphere must be exchanged first from oxidizing to neutral and then from neutral to reducing, the scrap must be preheated, and it must then be gently deposited on the melting hearth. One way to accomplish all these many functions is by charging the scrap into a bucket and by subjecting the scrap to these different procedures while it is kept in place inside such a bucket.

The bucket is initially positioned with its upper lip flush with the charge floor. The bucket sits inside a charging shaft which has its upper opening connected to the charging floor, and its lower opening connected to the inside of the melter. The charging shaft is intersected by a sliding door which disconnects the upper half of the shaft from its lower half. The shaft has also a tightly fitting door at its upper charge opening and has a gas inlet and a gas outlet to facilitate preheating and cleaning of the scrap prior to charging.

The bucket is connected to an elevator which sits above the charging floor. This elevator will lower the bucket from its upper position where it is flush with the charge floor to its lower position where it is just touching the melting hearth.

The bucket is filled with scrap while it sits flush with the charge floor. All conventional charging methods can be used. The bucket holds between one fourth and one half of the total melt charge. After the bucket has been filled the upper shaft door is lowered on top the charging shaft. This door seals the bucket contents from the ambient atmosphere and facilitates the purging of the bucket with hot flue gases. In the process of extended purging the scrap is heated to higher and higher temperatures, the scrap is initially dried from water, then from waste oils, and finally from residual paints and other organic materials. The contaminated flue gases must be processed prior to discharge into the atmosphere by an incinerator.

At the end of the preheating and cleaning steps the sliding door between the upper and lower shaft is opened. The flue gas atmosphere is exchanged by the reducing melter atmosphere. The bucket is then lowered to the melting floor and the contents of the bucket are gently deposited on the melting hearth. Gentle depositing is synonymous with long refractory life and a minimum of breakage due to localized impact loads. The gentle depositing occurs by bringing the lower corner of the bucket within a few inches of the melting hearth. The outer bucket shell which is separate from the bucket bottom but is supported by the bottom is lifted up while the bucket bottom stays in place. The scrap is not supported radially any longer and slides by its own weight down the steep slope. The bucket bottom and the bottom surface underneath have identical slopes which are angled at about 45 degrees to force the scrap to slide off. The melting hearth which connects the shaft exit with the melt vessel has a much more shallow slope of about 10 degrees which is not acute enough to cause the scrap to slide but which is steep enough to make liquid metal flow towards the melt vessel. The slope inside the shaft and the respective sizes of bucket and melting hearth are designed to completely empty the bucket.

After emptying the bucket can be retracted all the way up into its charging position. The intermediate sliding shaft door is again closed, the upper shaft volume is burned clean with an excess air burner or purged with flue gases and the charge door can be opened after a combustion gas analyzer shows that carbon monoxide and hydrogen have been removed from the upper shaft volume.

THE AIR PREHEATER AND WASTE HEAT RECUPERATOR

The melting process is essentially a batch process. The scrap is heated from cold to its melt temperature and is then further super heated to facilitate casting. In the early stages of every melt cycle the flue gases leave the process with a rather low temperature. This low flue gas temperature is synonymous with high thermal efficiency. However, as the temperature inside the melter increases the flue gas temperatures increase, too, and the thermal efficiency of this fuel fired melting process is continuously lowered. The process can be made more fuel efficient by recovering waste heat in the exhaust gases and by utilizing it for preheating both, the scrap and the combustion air.

The scrap can be heated very easily by bringing exhaust gases directly in contact with the scrap. The design of the upper shaft chamber facilitates this heat recovery. The upper shaft can be provided with an exhaust gas recirculation system. By providing the required inlet and outlet openings and by providing an induced draft fan or a recirculation fan it becomes possible to transfer a significant amount of waste heat to the scrap.

Additional waste heat can be recovered by preheating all the combustion air used in the process. Hot flue gases are taken from the exit of the heater drums and are directed into a high temperature air preheater. The design of the preheater can use either recuperative or regenerative design approaches. A regenerative design is much better suited due to the batch operation of the melter. However, any high temperature combustion air preheater can be utilized, too. The hot air from the air preheater is used to burn down the reducing atmosphere in the heating drums and is also used to produce the reducing atmosphere. For atmosphere production the preheat temperature of the combustion air is not always hot enough. To compensate it may be necessary for a short period during each melting cycle to use a small amount of oxygen to enrich the insufficiently heated combustion air.

THERMAL PROCESS EFFICIENCY

Due to the batch nature of the process and due to the combined heat recovery methods of direct scrap preheating and combustion air preheat the overall thermal efficiency is rather high. It is estimated that the final thermal efficiency will be better than around 50%. With such figures it appears entirely possible to reach a specific melter energy consumption of 1.75 MM Btu/ton. This figure compares favorably with the energy consumption of an electric melter of 500 kWhr/ton of an electric arc furnace. The predicted specific energy consumption of the gas fired melter is, therefore, approximately identical to the electric energy consumption of the electric arc furnace!

The energy costs for gas fired scrap melting will, therefore, be only about one third of those of electric arc melting. Operating costs will be further reduced because expensive carbon electrodes are not any longer required. Variable costs for melting can eventually be cut from about $28/ton to anywhere between $7/ton to $14/ton.

The comparatively high energy consumption of the electric arc melter is caused by the extensive use of water cooled surfaces within the melter proper. Electric furnace designers had to resort to this radical method of designing melter walls in order to reduce deterioration of exposed surfaces. The very erratic nature of the electric arc discharge causes extreme temperature fluctuations on all exposed surfaces and leads to fast deterioration of surfaces subjected to direct radiation from the arc.

The gas fired melter produces much narrower temperature fluctuations with much longer cycles. Local temperature fluctuations are dramatically reduced and life expectancy of refractory linings is substantially increased.

SUMMARY

In the foregoing a novel melting device has been described which is based on the utilization of natural gas. The proposed concept takes advantage of the special properties only offered by natural gas. Natural gas has the highest hydrogen content of all fuels except hydrogen itself and molecular hydrogen is very reducing to iron at elevated temperatures. Melt losses are completely eliminated by exposing the hot scrap only to a reducing atmosphere which results in additional savings. Also, scrap with high exposed surfaces like borings and turnings can be melted in this new melter design.

Even dirty scrap, which previously either had to be cleaned or which created major emissions, can be charged and the emissions can be eliminated with this design. This design furthermore offers one additional, unusual process advantage. Ferrous scrap which is contaminated with large amounts of heavy metals can be cleaned prior to melting from such contaminants. Lead, zinc, tin, cadmium, brass, and copper can be removed in metallic form. These metals can be removed by heating the scrap under a reducing atmosphere inside the shaft to the respective melting temperatures of these metals. Recovery of these metals requires a slightly modified operation of the shaft and also requires modified sizing but can be accomplished with the proposed design.

The novel device consist of the melter proper, the liquid melt holding vessel, the heating drums, the melting hearth, atmosphere generating burners, and the charging shaft with its two doors and the charging bucket with elevator. An air preheater and a scrap preheater with exhaust gas cleaning loop complete the installation.

First analysis shows that this melter is suited for melting capacities in the 5 to 150 ton/hour range and that a specific fuel consumption of as low as 1.75 MM Btu/ton can be expected after continuing development.

This novel melter is designed for melting of ferrous scrap, turnings and borings, and prereduced pellets. It can be adapted to the melting of large quantities of non ferrous metals as well.

The invention has been described with reference to a preferred embodiment and alternatives thereto. Obviously, modifications and alterations will occur to others upon a reading and understanding of the specifications. It is my intention to include all such modifications and alterations as they come within the scope of the present invention.

It is thus the essence of my invention to provide an indirect high temperature heat transfer system using natural gas as a fuel and preferably in the form of a metal melting furnace wherein numerous inherent advantages in the indirect heat transfer system can be commercially utilized.

Having thus described the invention, I claim:

1. A gas fired furnace system for melting ferrous and non-ferrous metals comprising:
   a) a furnace enclosure having an inclined hearth;
   b) an object having a radiation surface within said furnace enclosure;
   c) a liquid melt holding vessel in fluid communication with said hearth at one end thereof for receiving melted metal and means associated with said holding vessel for discharging liquid metal therefrom;
   d) vestibule means associated with said inclined hearth for receiving said metal sealed from ambient atmosphere and depositing said metal onto said hearth;
   e) gas burner means within said enclosure for generating a heated reducing furnace atmosphere rich in hydrogen; and
   f) indirect heating means for reacting a portion of said reducing furnace atmosphere with oxygen to heat said radiation surface of said object to a supermelt temperature higher than that of said reducing furnace atmosphere and at least sufficient to melt said metal when said object radiates said heat to said metal on said hearth for melting same.

2. A gas fired furnace system for melting ferrous and non-ferrous metals comprising:
   a) a furnace enclosure having an inclined hearth;
   b) a liquid melt holding vessel in fluid communication with said hearth at one end thereof for receiving melted metal and means associated with said holding vessel for discharging liquid metal therefrom;
   c) vestibule means associated with said inclined hearth for receiving said metal sealed from ambient atmosphere and depositing said metal onto said hearth;
   d) gas burner means within said furnace enclosure for generating from partially reacted gas a heated reducing furnace atmosphere rich in hydrogen; and
   e) indirect heating means for reacting a portion of said furnace atmosphere with oxygen to heat an object within said furnace enclosure to a temperature higher than that of said reducing furnace atmosphere and at least sufficient to melt said metal when said object radiates said heat to said metal on said hearth for melting same, said indirect heating means further includes
      i) said object having an arcuate heat transfer surface;
      ii) chamber means apart from said furnace enclosure defining a convection heat transfer chamber;
      iii) means for moving said arcuate surface into said convection heat transfer chamber from said furnace enclosure and out of said heat transfer chamber into said furnace enclosure;
      iv) slot means providing fluid communication between said convection heat transfer chamber and said furnace enclosure; and
      v) jet impingement means for heating said arcuate surface to a supermelt temperature when in said convection heat transfer chamber whereby said arcuate surface radiates heat at a superheat temperature when said arcuate surface is moved from said chamber into said furnace enclosure.

3. The gas fired melting furnace system of claim 2 further including
   said jet impingement means including a plurality of free standing jets directing combustion air against said arcuate surface, said jet means effective to draw a portion of said furnace atmosphere into said convection heat transfer chamber through said slot means and reacting said furnace atmosphere with said combustion air to produce intensely heated products of combustion impinging said arcuate surface within said convection heat transfer chamber; and said slot means in combination with said jet impingement means effectively functioning as an orifice to meter said furnace atmosphere into said convection heat transfer chamber for combustion therein at a predetermined temperature.

4. The gas fired melting furnace system of claim 3 wherein said object is a cylinder and said arcuate heat transfer surface is cylindrical;

said chamber means includes an insulated, longitudinally extending arcuately shaped stationary wall spaced radially outwardly from and surrounding a portion of said cylinder to define said convection heat transfer chamber extending between said stationary wall and said cylindrical surface, said stationary wall having lands at its arcuate ends extending radially inwardly towards said cylinder to define a longitudinally extending slot between each land and said cylinder, said lands circumferentially spaced relative to said cylinder to extend about a predetermined arcuate segment of said cylinder;

said plurality of jets having nozzles extending through said insulated stationary wall and directed to impinge said free standing jets against said cylinder at predetermined angles relative to the centerline of said cylinder so that the reacted furnace atmosphere remains substantially within said convection heat transfer chamber; and said means for moving effective to rotate said cylinder about its axis to cause said arcuate segment to rotate into said convection heat transfer chamber where it is heated and out of said convection heat transfer chamber where its heat is radiated to said metal.

5. The gas fired melting furnace system of claim 4 wherein said arcuate stationary wall is cylindrical and is concentric with said cylinder; and each land is cylindrical and concentric with said cylinder.

6. The gas fired melting furnace system of claim 4 wherein each land has a forward edge adjacent said furnace enclosure and a rearward edge adjacent said convection heat transfer chamber, said forward edge extending radially inwardly further than said rearward edge.

7. The gas fired melting furnace system of claim 5 wherein said jet nozzles are positioned within said stationary wall so that the centerline of each nozzle generally intersects the center of said cylinder.

8. The gas fired melting furnace system of claim 5 wherein said stationary wall has a circumferentially centered midpoint and a circumferential midpoint centerline extending through said midpoint and the center of said cylinder; and the centerlines of said jet nozzles adjacent said lands form obtuse included angles with said circumferential midpoint centerline whereby the jet streams emanating from said jet nozzles cause said reducing furnace atmosphere to be pulled through said slots into said convection heat transfer chamber and substantially remain within said convection heat transfer chamber.

9. A gas fired furnace system for melting ferrous and non-ferrous metals comprising:
a) a furnace enclosure having an inclined hearth;
b) a liquid melt holding vessel in fluid communication with said hearth at one end thereof for receiving melted metal and means associated with said holding vessel for discharging liquid metal therefrom;
c) vestibule means associated with said inclined hearth for receiving said metal sealed from ambient atmosphere and depositing said metal onto said hearth;
d) gas burner means within said furnace enclosure for generating from partially reacted gas a heated reducing furnace atmosphere rich in hydrogen; and
e) indirect heating means for reacting a portion of said furnace atmosphere with oxygen to heat an object within said furnace enclosure to a temperature higher than that of said reducing furnace atmosphere and at least sufficient to melt said metal when said object radiates said heat to said metal on said hearth for melting same, said gas burner means produces a reducing furnace atmosphere having a composition of which approximately half is nitrogen and 10% to 25% is unreacted hydrogen;

said object has a heat transfer surface movable into and out of said furnace enclosure;

a convection heat transfer chamber associated with but separate from said furnace enclosure;

said indirect heating means including slot means effective to meter a portion of said reducing furnace atmosphere into said convection heat transfer chamber and jet impingement means for introducing oxygen into said convection heat transfer chamber such that said hydrogen in said reducing furnace atmosphere is combusted and said heat transfer surface is heated by products of combustion from the reacted furnace atmosphere to a temperature substantially in excess of said reducing furnace atmosphere.

10. The gas melting furnace system of claim 9 wherein said gas burner means generates said furnace atmosphere of is approximately 16.5% hydrogen
15% carbon monoxide
10.5% water vapor
2.8% carbon dioxide
55.2% nitrogen and said gas burner means includes burner control means for supplying natural gas to said gas burner means and preheated air to said gas burner means at a fuel to air ratio of 1 part fuel to 4.5 to 6 parts air.

11. The gas fired melting furnace system of claim 9 wherein said jet impingement means produce products of combustion when said oxygen reacts with said furnace atmosphere and an exhaust is provided in said convection heat transfer chamber for venting a portion of said products of combustion;

heat exchange means in fluid communication with said exhaust for transferring heat to a supply of combustion air and heating same, said heated combustion air used to supply said oxygen to said convection heat transfer chamber and to furnish combustion air to said gas burner means.

12. The gas fired melting furnace system of claim 11 wherein said gas burner means is effective to maintain said furnace enclosure at a positive pressure;

control means positioned on said exhaust for controlling the pressure in said furnace enclosure by regulating the exhaust of said products of combustion from said convection heat transfer chamber.

13. The gas fired melting furnace system of claim 9 wherein said indirect heating means also mixes and auto ignites said reducing furnace atmosphere in said convection heat transfer chamber and heats said products of combustion in said convection heat transfer chamber to temperatures in excess of 1000° to 2000° F. above the temperature of said reducing furnace atmosphere.

14. The gas fired melting furnace system of claim 13 wherein said temperature of said products of combustion is in excess of about 4000° to 5000° F.

15. The gas furnace system of claim 4 further including an exhaust stack in fluid communication only with said convection heat transfer chamber and means controlling the flow of said products of combustion in said exhaust stack to control the pressure of said furnace atmosphere in said furnace enclosure; and means for sampling gas composition elements of said products of combustion and controlling the pressure of said combustion air emitted through said jet nozzles in response to said sampled gas composition.

16. The gas furnace system of claim 15 further including said sampling means controlling said means for controlling exhaust from said chamber.

17. The gas furnace system of claim 16 further including means for controlling the rotational speed of said cylinder, and said sampling means also controlling said means for controlling said rotational speed of said cylinder.

18. A gas fired furnace system for melting ferrous and non-ferrous metals comprising:

a) a furnace enclosure having an inclined hearth;

b) a liquid melt holding vessel in fluid communication with said hearth at one end thereof for receiving melted metal and means associated with said holding vessel for discharging liquid metal therefrom;

c) vestibule means associated with said inclined hearth for receiving said metal sealed from ambient atmosphere and depositing said metal onto said hearth;

d) gas burner means within said furnace enclosure for generating a heated reducing furnace atmosphere rich in hydrogen; and e) indirect heating means for reacting a portion of said furnace atmosphere with oxygen to heat an object within said furnace enclosure to a temperature higher than that of said reducing furnace atmosphere and at least sufficient to melt said metal when said object radiates said heat to said metal on said hearth for melting same, said vestibule means includes a vertically extending sealed charge shaft at one side of and adjacent the top end of said furnace enclosure;

said furnace enclosure having a discharge opening at the bottom thereof in fluid communication with said liquid melt holding vessel;

said inclined hearth extending from said charge shaft to said discharge opening and having at least first and second contiguous inclined surfaces, said first surface inclined at a vertical angle which is sufficiently steep to cause said metal to flow down said first surface from said shaft, said second surface defined as a repose surface and vertically inclined at a lesser angle than said first inclined surface sufficient to prevent solid metal from moving thereon while permitting molten metal to flow to said opening;

said indirect heating means effective to heat by radiation said first and second inclined surfaces to a superheat temperature whereby said metal is not only heated directly by said object's thermal radiation but also by conduction and radiation from said first and second inclined surfaces to assure that said metal, in a liquid state, continues to be superheated as it flows down said inclined surfaces to said opening.

19. A gas fired furnace system for melting ferrous and non-ferrous metals comprising:

a) a furnace enclosure having an inclined hearth;

b) a liquid melt holding vessel in fluid communication with said hearth at one end thereof for receiving melted metal and means associated with said holding vessel for discharging liquid metal therefrom;

c) vestibule means associated with said inclined hearth for receiving said metal sealed from ambient atmosphere and depositing said metal onto said hearth;

d) gas burner means within said furnace enclosure for generating a heated reducing furnace atmosphere rich in hydrogen; and e) indirect heating means for reacting a portion of said furnace atmosphere with oxygen to heat an object within said furnace enclosure to a temperature higher than that of said reducing furnace atmosphere and at least sufficient to melt said metal when said object radiates said heat to said metal on said hearth for melting same;

said vestibule means includes a generally vertically extending shaft having a top charge end and a bottom discharge end, said bottom end situated in said furnace enclosure adjacent said inclined hearth, charge door sealing means adjacent said charge end for sealing said shaft from ambient atmosphere; sliding door sealing means intermediate said shaft's charge and discharge ends and effective to seal the top portion of said shaft from the bottom portion thereof; an open ended charge bucket within said shaft; bucket lift means for moving said charge bucket between the top and bottom portions of said shaft; a bottom plate adapted to close the bottom end of said charge bucket; bottom lift means for moving said bottom plate into and out of contact with the bottom end of said charge bucket; said bottom plate vertically inclined relative to said charge bucket and said shaft at approximately the same angle as said inclined hearth; said bucket lift and said bottom lift means effective to lower said bucket with said plate adjacent to said hearth and lift said bucket from the bottom portion of said shaft to the top portion thereof while said plate remains adjacent said hearth to permit said metal to gently and non-destructively slide by its own weight down said inclined hearth.

20. The gas fired melting furnace system of claim 19 further including said hearth having at least first and second contiguous vertically inclined surfaces, said first inclined surface adjacent said bottom end of said shaft and having a vertical slope steep enough to permit said metal to slide therealong when said bucket is lifted towards the top portion of said shaft, said second surface adjacent said melt holding vessel and having a shallow vertical slope to permit said second surface to function as a repose surface while permitting melted metal to flow into said melt hold vessel.

21. The gas fired melting furnace system of claim 20 wherein said slope of said first inclined surface is about 45° and said slope of said second inclined surface is about 10°.

22. The gas fired melting furnace system of claim 19 further including
purge means for purging said shaft of i) ambient atmosphere or ii) said reducing furnace atmosphere;
shaft control means effective to
a) cause said sliding door means to seal said top shaft portion from said bottom shaft portion when said charge door sealing means opens said shaft to atmosphere for loading said charge bucket with metal and to maintain said top shaft portion sealed from said bottom portion while actuating said charge door sealing means to seal said shaft from ambient atmosphere and actuate said purge means;
b) cause said sliding door means to open said top shaft portion to said bottom shaft portion while said bucket and bottom lift means moves said bucket adjacent said hearth; and
c) cause said sliding door means to seal said top shaft portion from said bottom shaft after causing said bucket means to return said bucket to said shaft top portion subsequently followed by said bottom lift means returning said bottom plate to said bucket and actuating said purge means prior to actuating said charge door means to open said top portion of said shaft for charging said charge bucket with metal.

23. The gas melting system of claim 19 further including means to preheat said metal in said charge bucket in the top portion of said shaft when said sliding door means and said charge door sealing means seal said top portion of said shaft from said furnace enclosure and ambient atmosphere.

24. The gas melting system of claim 23 wherein said indirect heating means includes a convection chamber associated with but separate and apart from said further enclosure, slot means for providing fluid communication between said furnace enclosure and said convection chamber; jet impingement means for reacting said furnace atmosphere in said convection chamber with combustion air to produce heated products of combustion; an exhaust stack in fluid communication with said convection chamber; flow control means for exhausting through said exhaust stack a controlled flow of said products of combustion at elevated temperature;
said preheat means in fluid communication with said exhaust duct and operable to purge and heat said metal in said charge bucket; and
heat exchange means in communication with a source of combustion air and said exhaust stack for heating said combustion air prior to injection into said convection chamber.

25. The gas fired melting furnace system of claim 4 wherein a plurality of said cylinders and said convection heat transfer chambers are provided for said furnace enclosure.

26. A gas fired system for high temperature heat transfer application to work comprising:
a) a furnace enclosure containing work to be heated;
b) gas fired burner means substoichiometrically reacting combustible gas with combustion air to produce heated products of combustion directly fired into said furnace enclosure, said products of combustion defining a reducing furnace atmosphere rich in unreacted hydrogen;
c) an object within said furnace having a heat transfer surface;
d) a convection chamber associated with but separate from said furnace enclosure;
e) slot means between said furnace enclosure and said convection chamber for providing controlled flow of furnace atmosphere into said convection chamber;
f) means for moving said heat transfer surface from said furnace enclosure to said convection chamber and from said convection chamber to said furnace enclosure;
g) jet impingement means within said chamber directing jet streams of combustion air within said convection chamber for i) causing said furnace atmosphere to be metered into said convection chamber through said slot means, ii) auto igniting and reacting said hydrogen in said furnace atmosphere with said combustion air at temperatures substantially above said furnace atmosphere and iii) convectively transferring said heat from said reacted furnace atmosphere by impinging said jet streams against said heat transfer surface whereby said heated heat transfer surface will radiate its heat at an elevated temperature to said work when said moving means moves said heat transfer surface into said furnace enclosure.

27. The gas fired system of claim 26 wherein
said object is a cylinder and said arcuate heat transfer surface is cylindrical;
said convection chamber includes an insulated, longitudinally extending arcuately shaped stationary wall spaced radially outwardly from and surrounding a portion of said cylinder, said stationary wall having a land at its arcuate ends extending radially inwardly towards said cylinder to define a longitudinally extending slot extending between each land and said cylinder, said lands circumferentially spaced relative to said cylinder to extend about a predetermined arcuate segment of said cylinder;
said plurality of jets having nozzles extending through said insulated stationary wall and directed to impinge said jet streams against said cylinder at predetermined angles relative to the centerline of said cylinder so that the reacted furnace atmosphere remains substantially within said convection chamber; and
said means for moving effective to rotate said cylinder about its axis to cause said arcuate segment to rotate into said convection chamber where it is heated and out of said convection chamber where its heat is radiated to said work.

28. The gas fired system of claim 27 wherein
said arcuate stationary wall is cylindrical and is concentric with said cylinder; and each land is cylindrical and concentric with said cylinder.

29. The gas fired melting furnace system of claim 28 wherein
said jet nozzles are positioned within said stationary wall so that the centerline of each nozzle generally intersects the center of said cylinder.

30. The gas fired melting furnace system of claim 27 wherein
said stationary wall has a circumferentially centered midpoint and a circumferential midpoint centerline extending through said midpoint and the center of said cylinder; and
the centerlines of said jet nozzles adjacent said lands form obtuse included angles with said circumferential midpoint centerline whereby said jet streams emanating from said jet nozzles cause said furnace atmosphere to be pulled through said slots into said convection chamber and substantially remain within said convection chamber.

31. A gas fired metal melting furnace comprising:
a) a furnace enclosure having a bottom opening for receiving melted metal, a contiguous side wall and a top wall having an opening for receiving metal;
b) a hearth adjacent to at least a portion of said side wall and adjacent to said metal receiving opening, said hearth vertically inclined from said opening and said side wall to said bottom opening;
c) an object having a radiating heat transfer surface within said furnace enclosure;
d) gas fired means for reacting combustible gas with oxygen to heat the atmosphere within said furnace enclosure to a first predetermined temperature and to heat said radiating surface to a second predetermined temperature higher than said first temperature so that said surface radiates heat to said metal and said hearth; and
e) a shaft at said opening having a discharge end adjacent said opening at its bottom end and a charge opening for receiving metal at its top end with charge door means for sealing said shaft's opening; an open ended bucket for receiving said metal and movable within said shaft; a bottom plate adapted to close the bottom end of said bucket; and elevator means for independently moving said bottom plate and said bucket and effective to move said bucket and plate together with metal in said bucket to a position through said opening in said enclosure and adjacent said hearth and to lift said bucket from said bottom plate whereby said metal gently flows onto said hearth.

32. The gas fired melting furnace of claim 31 further including
sliding door means within said shaft in between its ends to divide said shaft into a preheat chamber adjacent to its top end and a discharge chamber adjacent its bottom end and said sliding door means is effective to seal said preheat chamber from said discharge chamber and to provide fluid communication between said preheat and said discharge chambers; and
means for purging and heating said preheat chamber to a temperature whereat said scrap is thermally cleaned by volatilizing any organic material deposited thereon.

33. The gas fired melting furnace of claim 32 further including
said inclined hearth having at least first and second contiguous, vertically inclined surfaces, said first inclined surface adjacent said discharge chamber and having a vertical slope steep enough to permit said metal to slide therealong when said bucket is lifted towards said preheat chamber, said second surface adjacent to said bottom opening in said enclosure and having a shallow vertical slope to permit said second surface to function as a response surface while permitting melted metal to flow into said melt hold furnace.

34. The gas fired melting furnace of claim 31 wherein said gas fired means includes gas burner means within said enclosure for generating from a heated reducing furnace atmosphere rich in hydrogen and indirect heating means for reacting a portion of said reducing furnace atmosphere with oxygen to heat an object within said furnace enclosure to a temperature higher than that of said reducing atmosphere and at least sufficient to melt said metal when said object radiates said heat to said metal on said hearth for melting same.

35. The gas fired melting furnace of claim 34 wherein said indirect heating means further includes
i) said object having an arcuate heat transfer surface;
ii) chamber means apart from said furnace enclosure defining a convection heat transfer chamber;
iii) means for moving said arcuate surface into said convection heat transfer chamber from said furnace enclosure and out of said convection heat transfer chamber into said furnace enclosure;
iv) slot means providing fluid communication between said convection heat transfer chamber and said furnace enclosure; and
v) jet impingement means for heating said arcuate surface to a supermelt temperature when in said convection heat transfer chamber whereby said arcuate surface radiates heat at a superheat temperature when said arcuate surface is moved from said convection heat transfer chamber into said furnace enclosure.

36. The gas fired melting furnace of claim 35 further including
said jet impingement means including a plurality of free standing jets directing combustion air against said arcuate surface, said jet means effective to draw a portion of said furnace atmosphere into said convection heat transfer chamber through said slot means and reacting said furnace atmosphere with said combustion air to produce intensely heated products of combustion impinging said arcuate surface within said convection heat transfer chamber; and
said slot means in combination with said jet impingement means effectively functioning as an orifice to meter said furnace atmosphere into said convection heat transfer chamber for combustion therein at a predetermined temperature.

37. The gas fired melting furnace of claim 36 wherein said object is a cylinder and said arcuate heat transfer surface is cylindrical;
said chamber means includes an insulated, longitudinally extending arcuately shaped stationary wall spaced radially outwardly from and surrounding a portion of said cylinder to define said convection heat transfer chamber extending between said stationary wall and said cylindrical surface, said stationary wall having lands at its arcuate ends extending radially inwardly towards said cylinder to define a longitudinally extending slot between each land and said cylinder, said lands circumferentially spaced relative to said cylinder to extend about a predetermined arcuate segment of said cylinder;

said plurality of jets having nozzles extending through said insulated stationary wall and directed to impinge said free standing jets against said cylinder at predetermined angles relative to the centerline of said cylinder so that the reacted furnace atmosphere remains substantially within said convection heat transfer chamber; and said means for moving effective to rotate said cylinder about its axis to cause said arcuate segment to rotate into said convection heat transfer chamber where it is heated and out of said convection heat transfer chamber where its heat is radiated to said metal.

38. A process for melting ferrous and non-ferrous metals by combusting natural gas comprising the steps of:

a) providing a sealed furnace enclosure with a vertically inclined hearth upon which metal to be melted rests;

b) producing a reducing furnace atmosphere having in excess of 10% free unreacted hydrogen within said enclosure at temperatures in excess of 3000° F. by substoichiometrically reacting combustion air with natural gas in ratios of approximately 4 to 6 parts air to 1 part gas;

c) providing an object having a radiation heat transfer surface;

d) providing a combustion chamber apart from said furnace enclosure and in fluid communication therewith and moving said radiation surface from said furnace enclosure to said combustion chamber;

e) injecting jet streams of oxygen into said combustion chamber at sufficient velocity and impingement angles with said radiation surface to i) draw a portion of said reducing furnace atmosphere into said combustion chamber, ii) auto ignite and react said hydrogen in said reducing furnace atmosphere with said oxygen to produce a reacted atmosphere in excess of 4000° to 5000° F. and iii) impinge said radiation surface with said jet streams to convectively heat said radiation surface to temperatures in excess of said reducing furnace atmosphere temperature; and f) moving said heated radiated surface into said furnace enclosure to heat said metal and said hearth by radiation.

39. A gas fired ferrous scrap melting furnace comprising an insulated furnace casing defining a furnace enclosure having a top opening for receiving scrap and a bottom opening for discharging liquid metal;

a gas fired burner; means for operating said gas fired burner substoichiometrically to generate a heated reducing furnace atmosphere within said furnace enclosure;

an object having a radiation surface within said furnace enclosure;

means for heating said radiation surface of said object to a supermelt temperature by reacting a portion of said reducing furnace atmosphere with combustion air whereby said object can indirectly heat said scrap by radiation for melting thereof.

* * * * *